US010886769B2

(12) United States Patent
Kasar et al.

(10) Patent No.: US 10,886,769 B2
(45) Date of Patent: *Jan. 5, 2021

(54) INDUCTIVE CHARGING BETWEEN ELECTRONIC DEVICES

(71) Applicant: Apple Inc., Cupertino, CA (US)

(72) Inventors: Darshan R. Kasar, San Francisco, CA (US); Christopher S. Graham, San Francisco, CA (US); Eric S. Jol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,517

(22) Filed: Aug. 30, 2019

(65) Prior Publication Data

US 2019/0386507 A1 Dec. 19, 2019

Related U.S. Application Data

(63) Continuation of application No. 14/731,280, filed on Jun. 4, 2015, now Pat. No. 10,404,089.

(Continued)

(51) Int. Cl.
*H02J 7/02* (2016.01)
*G06F 1/26* (2006.01)
(Continued)

(52) U.S. Cl.
CPC .............. *H02J 7/025* (2013.01); *H01F 38/14* (2013.01); *H02J 5/005* (2013.01); *H02J 7/0042* (2013.01);
(Continued)

(58) Field of Classification Search
CPC ........ H02J 7/025; H02J 7/0042; H02J 7/0054; H02J 5/005; H02J 2007/0059; H02J 7/342;
(Continued)

(56) References Cited

U.S. PATENT DOCUMENTS 4,612,467 A 9/1986 Clegg
5,198,647 A 3/1993 Mizuta
(Continued)

FOREIGN PATENT DOCUMENTS

CN 101867203 10/2010
CN 102257696 11/2011
(Continued)

OTHER PUBLICATIONS

U.S. Appl. No. 14/731,280 , "Non-Final Office Action", dated Sep. 1, 2017, 11 pages.
(Continued)

*Primary Examiner* — M Baye Diao
(74) *Attorney, Agent, or Firm* — Kilpatrick Townsend & Stockton LLP

(57) ABSTRACT

An electronic device and methods for inductively charging an electronic device using another external electronic device. The electronic device may include an enclosure, a battery positioned within the enclosure, and an inductive coil coupled to the battery. The inductive coil may have two or more operational modes, including a power receiving operational mode for wirelessly receiving power and a power transmitting operational mode for wirelessly transmitting power. The electronic device may also have a controller coupled to the inductive coil for selecting one of the operational modes.

20 Claims, 37 Drawing Sheets

Related U.S. Application Data

(60) Provisional application No. 62/056,827, filed on Sep. 29, 2014.

(51) Int. Cl.
*H01F 38/14* (2006.01)
*H02J 5/00* (2016.01)
*H02J 7/00* (2006.01)
*H02J 7/34* (2006.01)
*H02J 50/10* (2016.01)
*H02J 50/90* (2016.01)

(52) U.S. Cl.
CPC ............ *H02J 7/342* (2020.01); *H02J 50/10* (2016.02); *H02J 50/90* (2016.02); *G06F 1/266* (2013.01); *H02J 2207/20* (2020.01)

(58) Field of Classification Search
CPC .... H02J 2207/20; H02J 2310/22; H02J 50/90; H02J 50/10; G06F 1/266; H01F 38/14; H04M 1/7253
USPC .................................................. 320/103, 108
See application file for complete search history.

(56) References Cited

U.S. PATENT DOCUMENTS

| | | | |
|---|---|---|---|
| 5,305,961 A | 4/1994 | Errard et al. | |
| 5,576,680 A * | 11/1996 | Ling | H01F 17/0033 257/E21.022 |
| 5,656,914 A * | 8/1997 | Nagele | H01M 2/1022 320/110 |
| 5,719,483 A | 2/1998 | Abbott et al. | |
| 6,265,789 B1 * | 7/2001 | Honda | H01F 38/14 307/33 |
| 6,975,198 B2 | 12/2005 | Baarman et al. | |
| 7,180,265 B2 | 2/2007 | Naskali et al. | |
| 7,477,128 B2 | 1/2009 | Quilici et al. | |
| 7,728,551 B2 * | 6/2010 | Reed | B60L 11/182 320/108 |
| 7,791,311 B2 | 9/2010 | Sagoo et al. | |
| 7,830,116 B2 | 11/2010 | Toya et al. | |
| 7,948,208 B2 | 5/2011 | Partovi et al. | |
| 7,952,322 B2 | 5/2011 | Partovi et al. | |
| 7,957,541 B2 * | 6/2011 | Edgren | H04R 1/26 381/89 |
| 8,169,185 B2 | 5/2012 | Partovi et al. | |
| 8,193,769 B2 | 6/2012 | Azancot et al. | |
| 8,229,356 B2 | 7/2012 | Kawamura | |
| 8,242,741 B2 * | 8/2012 | Phelps, III | H02J 50/10 320/108 |
| 8,336,786 B2 * | 12/2012 | Kato | H01Q 1/38 235/492 |
| 8,406,823 B2 | 3/2013 | Kondo et al. | |
| 8,421,574 B2 | 4/2013 | Suzuki et al. | |
| 8,482,160 B2 | 7/2013 | Johnson et al. | |
| 8,587,516 B2 * | 11/2013 | Kopychev | H02J 50/00 345/156 |
| 8,629,652 B2 | 1/2014 | Partovi et al. | |
| 8,629,654 B2 | 1/2014 | Partovi et al. | |
| 8,643,461 B2 | 2/2014 | Lim et al. | |
| 8,754,609 B2 | 6/2014 | Tsai et al. | |
| 8,760,255 B2 | 6/2014 | Yang et al. | |
| 8,796,989 B2 | 8/2014 | Lee et al. | |
| 8,844,817 B2 | 9/2014 | Glanzer et al. | |
| 8,845,590 B2 | 9/2014 | Ash | |
| 8,890,369 B2 | 11/2014 | Baarman et al. | |
| 8,890,470 B2 | 11/2014 | Partovi | |
| 8,896,264 B2 | 11/2014 | Partovi | |
| 8,901,881 B2 | 12/2014 | Partovi | |
| 8,907,752 B2 * | 12/2014 | Wodrich | H01F 38/14 335/219 |
| 8,912,686 B2 | 12/2014 | Stoner, Jr. et al. | |
| 8,922,065 B2 | 12/2014 | Sun et al. | |
| 8,922,161 B2 * | 12/2014 | Choi | H04N 13/341 320/108 |
| 8,922,162 B2 | 12/2014 | Park et al. | |
| 8,947,041 B2 | 2/2015 | Cook et al. | |
| 8,947,042 B2 | 2/2015 | Kirby et al. | |
| 8,947,047 B2 | 2/2015 | Partovi et al. | |
| 9,054,417 B2 | 6/2015 | Lin | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,118,193 B2 | 8/2015 | Yeh | |
| 9,124,308 B2 | 9/2015 | Metcalf | |
| 9,130,408 B2 | 9/2015 | Ichikawa | |
| 9,142,999 B2 * | 9/2015 | Von Novak | H02J 7/00047 |
| 9,160,204 B2 | 10/2015 | Yeh | |
| 9,178,369 B2 | 11/2015 | Partovi | |
| 9,190,849 B2 | 11/2015 | Won et al. | |
| 9,246,214 B2 | 1/2016 | Pope et al. | |
| 9,266,216 B2 | 2/2016 | Masumura | |
| 9,362,776 B2 * | 6/2016 | Low | H01F 38/14 |
| 9,466,420 B2 * | 10/2016 | Van Gils | H02J 7/025 |
| 9,698,632 B2 * | 7/2017 | Davison | H02J 50/40 |
| 9,716,401 B2 * | 7/2017 | Wojcik | H02J 50/12 |
| 10,404,089 B2 * | 9/2019 | Kasar | H01F 38/14 |
| 10,505,386 B2 | 12/2019 | Kasar et al. | |
| 2005/0047621 A1 * | 3/2005 | Cranfill | H04M 1/03 381/334 |
| 2005/0288743 A1 | 12/2005 | Ahn et al. | |
| 2006/0049481 A1 | 3/2006 | Tiemeijer et al. | |
| 2010/0081378 A1 | 4/2010 | Kawamura et al. | |
| 2010/0148723 A1 | 6/2010 | Cook et al. | |
| 2010/0194335 A1 | 8/2010 | Kirby et al. | |
| 2010/0253153 A1 | 10/2010 | Kondo et al. | |
| 2011/0050164 A1 | 3/2011 | Partovi et al. | |
| 2011/0115433 A1 | 5/2011 | Lee et al. | |
| 2011/0143556 A1 | 6/2011 | Hsu | |
| 2011/0221385 A1 | 9/2011 | Partovi et al. | |
| 2011/0225073 A1 | 9/2011 | Won et al. | |
| 2012/0052923 A1 * | 3/2012 | Park | H02J 7/00034 455/567 |
| 2012/0098484 A1 | 4/2012 | Cheng et al. | |
| 2012/0112553 A1 | 5/2012 | Stoner, Jr. et al. | |
| 2013/0026981 A1 | 1/2013 | Van Der Lee | |
| 2013/0069595 A1 | 3/2013 | Rejman et al. | |
| 2013/0084796 A1 * | 4/2013 | Kerr | G06F 1/1683 455/39 |
| 2013/0093388 A1 | 4/2013 | Partovi | |
| 2013/0099563 A1 | 4/2013 | Partovi et al. | |
| 2013/0107126 A1 | 5/2013 | Nonomura et al. | |
| 2013/0119926 A1 | 5/2013 | Lin et al. | |
| 2013/0127252 A1 | 5/2013 | Yerazunis et al. | |
| 2013/0127406 A1 | 5/2013 | Winger et al. | |
| 2013/0249479 A1 | 9/2013 | Partovi | |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2014/0021909 A1 | 1/2014 | Klawon et al. | |
| 2014/0070620 A1 | 3/2014 | Yeh et al. | |
| 2014/0080411 A1 * | 3/2014 | Konanur | H04B 5/0025 455/41.1 |
| 2014/0083997 A1 | 3/2014 | Chen et al. | |
| 2014/0097790 A1 | 4/2014 | Yeh et al. | |
| 2014/0103873 A1 | 4/2014 | Partovi et al. | |
| 2014/0132210 A1 | 5/2014 | Partovi | |
| 2014/0151079 A1 * | 6/2014 | Furui | H02J 7/00 173/46 |
| 2014/0191568 A1 | 7/2014 | Partovi | |
| 2014/0206372 A1 | 7/2014 | Zeng et al. | |
| 2014/0306654 A1 | 10/2014 | Partovi | |
| 2015/0130412 A1 | 5/2015 | Partovi | |
| 2015/0137801 A1 * | 5/2015 | Raedy | B60L 53/305 324/207.15 |
| 2015/0145475 A1 | 5/2015 | Partovi et al. | |
| 2015/0245122 A1 * | 8/2015 | Rayner | H04R 1/2896 381/152 |

(56) References Cited

U.S. PATENT DOCUMENTS

| | | | |
|---|---|---|---|
| 2015/0287527 A1 | 10/2015 | Kasar | |
| 2015/0302971 A1 | 10/2015 | Wagman et al. | |
| 2015/0303699 A1* | 10/2015 | Wagman | H02J 50/70 |
| | | | 307/104 |
| 2015/0311740 A1* | 10/2015 | Hilario | H01F 38/14 |
| | | | 320/108 |
| 2015/0326061 A1* | 11/2015 | Davison | H02J 7/025 |
| | | | 320/108 |
| 2016/0058375 A1* | 3/2016 | Rothkopf | A61B 5/0205 |
| | | | 600/301 |
| 2016/0064137 A1 | 3/2016 | Perez et al. | |
| 2016/0094076 A1 | 3/2016 | Kasar et al. | |
| 2016/0094078 A1 | 3/2016 | Graham et al. | |
| 2016/0141884 A1* | 5/2016 | Lee | H02J 50/12 |
| | | | 307/104 |

FOREIGN PATENT DOCUMENTS

| | | | |
|---|---|---|---|
| CN | 102377250 | 3/2012 | |
| CN | 103168405 | 6/2013 | |
| CN | 103378639 | 10/2013 | |
| CN | 106605353 | 4/2017 | |
| EP | 2535906 | 12/2012 | |
| EP | 2597747 | 5/2013 | |
| EP | 2621050 | 7/2013 | |
| EP | 2693591 | 2/2014 | |
| EP | 2945256 A2 * | 11/2015 | H02J 50/80 |
| FR | 2883428 | 3/2008 | |
| HK | 1235162 | 3/2018 | |
| JP | 58087804 | 5/1983 | |
| JP | 08079976 | 3/1996 | |
| JP | 2008210862 | 9/2008 | |
| JP | 2011244624 | 12/2011 | |
| JP | 2012060812 | 3/2012 | |
| JP | 2014064375 | 4/2014 | |
| JP | 3213041 | 9/2017 | |
| KR | 20140010793 | 1/2014 | |
| KR | 20140113892 | 9/2014 | |
| TW | 201236299 | 9/2012 | |
| WO | 03105311 | 12/2003 | |
| WO | 2013165167 | 11/2013 | |
| WO | 2014039088 | 3/2014 | |
| WO | 2016053633 | 4/2016 | |

OTHER PUBLICATIONS

U.S. Appl. No. 14/731,280 , "Non-Final Office Action", dated Apr. 7, 2017, 18 pages.
U.S. Appl. No. 14/731,280 , "Non-Final Office Action", dated Nov. 16, 2018, 23 pages.
U.S. Appl. No. 14/731,280 , "Notice of Allowance", dated Apr. 19, 2019, 11 pages.
U.S. Appl. No. 14/731,280 , "Notice of Allowance", dated Dec. 11, 2017, 9 pages.
U.S. Appl. No. 15/925,410 , "First Action Interview Pilot Program Pre-Interview Communication", dated May 23, 2019, 6 pages.
Chinese Patent Application No. 201580046364.6 , "Office Action", dated Jul. 30, 2018, 13 pages.
Chinese Patent Application No. 201580046364.6 , "Office Action", dated Jul. 15, 2019, 5 pages.
Chinese Patent Application No. 201580046364.6 , "Office Action", dated Jan. 31, 2019, 7 pages.
Japanese Patent Application No. 2017-600031 , "Technical Evaluation Report", Oct. 30, 2017, 10 pages.
International Patent Application No. PCT/US2015/050619 , "International Preliminary Report on Patentability", dated Apr. 13, 2017, 11 pages.
International Patent Application No. PCT/US2015/050619 , "International Search Report and Written Opinion", dated Dec. 7, 2015, 13 pages.
U.S. Appl. No. 15/925,410 , "Notice of Allowance", dated Aug. 28, 2018, 12 pages.
Korea Patent Application No. 20-2017-7000023, Office Action, dated Nov. 15, 2019, 15 pages.
"Notice of Allowance," dated Mar. 16, 2020 in Korean Patent Application No. P23549UTM/KR1. 7 pages. (includes English translation of claims only).
"First Action Interview Pilot Program Pre-Interview Communication," dated Jun. 26, 2020 in U.S. Appl. No. 16/705,196. (copy not provided).
"Notice of Allowance and Fee(s) Due," dated Sep. 2, 2020 in U.S. Appl. No. 16/705,196. 23 pages. (no copy provided).
"Notification of Reexamination." dated Aug. 3, 2020 in Chinese Patent Application No. 201580046364.6. 15 pages, includes English translation.

* cited by examiner

INDUCTIVE CHARGING BETWEEN ELECTRONIC DEVICES

CROSS-REFERENCES TO RELATED APPLICATIONS

This application is a continuation of U.S. patent application Ser. No. 14/731,280, filed Jun. 4, 2015 and titled "Inductive Charging Between Electronic Devices," which is a non-provisional patent application of and claims the benefit to U.S. Provisional Patent Application No. 62/056,827, filed Sep. 29, 2014 and titled "Inductive Charging Between Electronic Devices," the disclosures of which are hereby incorporated by reference in their entirety for all purposes.

BACKGROUND

The disclosure relates generally to electronic devices and, more specifically, to wirelessly charging a first electronic device using a second electronic device.

Some electronic devices include one or more rechargeable batteries that may require external power to recharge. Often, these devices may be charged using a common or standardized electrical connector or cable. For example, some devices may be charged using a universal serial bus ("USB") connector or cable. However, despite having standardized connectors and cable, each device may require a separate or dedicated power supply to charge. In some cases, having separate power supplies for each device may be burdensome to use, store, and/or transport.

SUMMARY

Generally, embodiments discussed herein are related to an electronic device configured to inductively or wirelessly transfer power to a second, external electronic device. The wireless power transfer may be used to charge the battery of the first and/or second electronic device. The electronic devices may include inductive coils which may be configured to be in electrical communication with inductive coils of external electronic devices. In some embodiments, the electrically communicative inductive coils may act as transmitting coils and/or receiving coils capable of transmitting power between the electronic devices. This transmission of power may increase a charge of a battery of the electronic device receiving the power, while simultaneously decreasing the charge of a battery transmitting the power. The inductive coils of the electronic devices capable of transmitting power to external electronic devices may allow for the charging of the battery of an electronic device using only another electronic device. As such, only a single power cord or no power cords may be needed to charge one or more of a group of devices that include electrically communicative inductive coils.

Some example embodiments are directed to portable electronic device that include an enclosure defining an opening, a display positioned or disposed within the opening, a user input device positioned on an external surface of the display, and a battery positioned within or on the enclosure. The battery may be configured to provide electrical power to the display. The device may also include a transmit inductive coil within the enclosure and configured to wirelessly transmit power to an external device that is positioned proximate to the enclosure. In some embodiments, the transmit inductive coil is operatively coupled to the battery and is configured to wirelessly transmit power from the battery to the external device. In some embodiments, the device also includes a receive inductive coil that is positioned or disposed within the enclosure and configured to wirelessly receive power from the external device that is positioned proximate to the enclosure. In some embodiments, the portable electronic device includes a speaker within the enclosure and electrically coupled to the battery. The portable electronic device may also include a microphone within the enclosure and electrically coupled to the battery. In some cases, the user input device is a touch sensor or touch screen positioned on an exterior surface of the device.

Some example embodiments are directed to an electronic device, including an enclosure, a battery within the enclosure and an inductive coil within the enclosure and coupled to the battery. The inductive coil may be configured to operate in two or more operational modes that include: a power receiving mode for wirelessly receiving power from an external device; and a power transmitting mode for wirelessly transmitting power to the external device. The device may also include a controller that is coupled to the inductive coil and configured to select the operational mode of the inductive coil. In some cases, the controller is in electronic communication with the battery and configured to monitor a charge of the battery. In some embodiments, the device may include a display, a touch sensor, a speaker disposed or positioned within the enclosure and electrically coupled to the battery, and a microphone disposed or positioned within the enclosure and electrically coupled to the battery.

In some embodiments, the inductive coil is an inner inductive coil and the device includes an outer inductive coil surrounding the inner inductive coil. In some cases, while in the power transmitting mode, both the inner and outer inductive coils are activated to transmit wireless power. In some cases, while in the power receiving mode, only the inner inductive coil is activated to receive wireless power.

In some embodiments, the electronic device includes an alignment magnet that is positioned adjacent the inductive coil. The alignment magnet may be configured to assist in positioning the external device relative to the electronic device.

In some embodiments, the electronic device is one of a first mobile phone, a first smart phone, a first tablet computer, or a first notebook computer and the external device is one of: a second mobile phone, a second smart phone, a second tablet computer, or a second notebook computer.

In some embodiments, the battery of the electronic device is configured to be charged by the external device in the power receiving mode. In some embodiments, the battery of the electronic device is configured to charge the external device in the power transmitting mode.

Some example embodiments are directed to a method of inductively wirelessly coupling a first and a second electronic device. A first inductive coil of the first electronic device may be positioned relative to a second inductive coil of the second electronic device. Using a first controller of the first electronic device, an operational mode of the first inductive coil may be selected. The first inductive coil may be configured to operate in two or more modes, including: a power receiving operational mode for wirelessly receiving power, and a power transmitting operational mode for wirelessly transmitting power. The method may also include transmitting power from one of: the first inductive coil to the second inductive coil, or the second inductive coil to the first inductive coil. In some embodiments, an operational mode of the second inductive coil of the second electronic device is selected using a second controller of the second electronic device.

In some embodiments, the positioning of the first inductive coil relative to the second inductive coil includes positioning the first electronic device directly on the second electronic device, and aligning the first inductive coil of the first electronic device with the second inductive coil of the second electronic device. In some embodiments, the positioning of the first inductive coil relative to the second inductive coil includes coupling a first alignment magnet of the first electronic device to a second alignment magnet of the second electronic device. The first alignment magnet may be positioned adjacent to the first inductive coil, and the second alignment magnet may be positioned adjacent to the second inductive coil.

In some embodiments, selecting the operational mode of the first inductive coil includes: detecting a presence of the second electronic device, and selecting the operational mode of the first inductive coil in response to detecting the presence of the second electronic device.

In some embodiments, an outer inductive coil of the first electronic device is activated to wirelessly couple power with the second coil of the second electronic device, and the outer inductive coil may surround the first inductive coil. In some cases, when transmitting power from the first inductive coil of the first device to the second inductive coil of the second electronic device, a power coupling efficiency is estimated between the first inductive coil and the second inductive coil. In some cases, an outer inductive coil surrounding the first inductive coil is activated based on the estimation.

Some example embodiments are directed to a system that includes a first electronic device and a second electronic device. The first electronic device may include a first battery, a first inductive coil coupled to the first battery, and a first controller coupled to the first inductive coil for selecting an operational mode of the first inductive coil. The second electronic device may be positioned adjacent the first electronic device. The second electronic device may include a second battery, a second inductive coil coupled to the second battery, and a second controller coupled to the second inductive coil for selecting an operational mode of the second inductive coil. In some cases, the first controller is configured to select a power transmitting operational mode for wirelessly transmitting power from the first battery to the second battery using the first inductive coil. The first controller may also be configured to select a power receiving operational mode for wirelessly receiving power from the second battery to the first battery using the first inductive coil.

In some embodiments, the first electronic device includes a first alignment magnet positioned adjacent to the first inductive coil. In some embodiments, the second electronic device includes a second alignment magnet positioned adjacent to the second inductive coil. The second alignment magnet may be configured to attract the first alignment magnet to align the first inductive coil of the first electronic device with the second inductive coil of the second electronic device.

In some embodiments, the first electronic device includes an outer inductive coil surrounding the first inductive coil. The outer inductive coil may be coupled to the first battery and the first controller. In some embodiments, the second electronic device includes a second outer inductive coil surrounding the second inductive coil. The second outer inductive coil may be coupled to the second battery and the second controller. In some cases, the first inductive coil of the first electronic device is configured to wirelessly transfer power with at least one of: the second inductive coil of the second electronic device, and the second outer inductive coil of the second electronic device. The outer inductive coil of the first electronic device may be configured to wirelessly transfer power with at least one of: the second inductive coil of the second electronic device and the second outer inductive coil of the second electronic device.

In some embodiments, the first electronic device also includes a display and the first electronic device is configured to modify the graphical output of the display in response to the first electronic device being proximate to the second electronic device. In some cases, the graphical output of the display indicates an alignment condition of the first electronic device with respect to the second electronic device.

BRIEF DESCRIPTION OF THE DRAWINGS

The disclosure will be readily understood by the following detailed description in conjunction with the accompanying drawings, wherein like reference numerals designate like structural elements, and in which.

Figure 1:
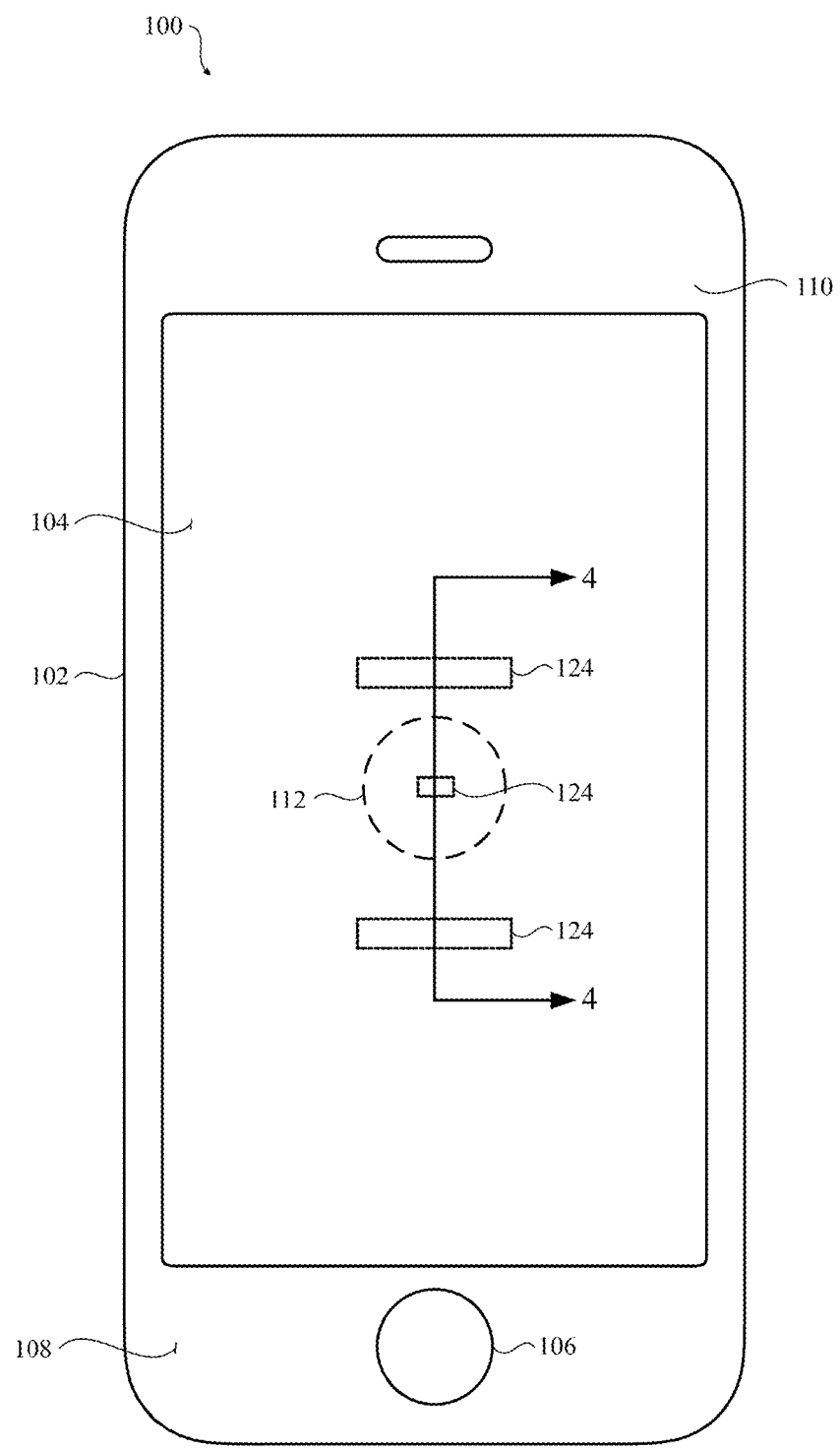
FIG. 1 shows an illustrative front view of a first electronic device including an inductive coil, according to embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

The following disclosure relates generally to electronic devices and more particularly to an electronic device configured to inductively charge at least one external electronic device and methods of inductively charging at least one electronic device using an external electronic device.

An electronic device may include an inductive coil, which may be configured to be in electrical communication with an external inductive coil of an external electronic device. In some cases, the inductive coils are wirelessly and inductively coupled. The wirelessly coupled inductive coils may act as transmitting coils and/or receiving coils capable of transmitting power between the two electronic devices. In some cases, the transmission of power may increase a charge of a battery of a first electronic device that is receiving the power, while simultaneously decreasing the charge of a battery of a second electronic device that is transmitting the power. Using the inductive coils, the battery of a first electronic device may be charged using the second external electronic device. As such, only a single power cord (connected to the second external electronic device) or no power cords may be needed to charge multiple devices that include inductive coils that are wirelessly coupled across the devices.

These and other embodiments are discussed below with reference to FIGS. 1-28. However, those skilled in the art will readily appreciate that the detailed description given herein with respect to these figures is for explanatory purposes only and should not be construed as limiting.

FIG. 1 shows an illustrative front view of one example of an electronic device 100 including at least one inductive coil 112. In the illustrated embodiment, first electronic device 100 is implemented as a portable electronic device, in particular, a mobile phone. As discussed herein, other embodiments can implement first electronic device 100 differently, such as, for example, as a notebook or desktop computer, a tablet computing device, a gaming device, a display, a digital music player, a wearable computing device or display, a health monitoring device, and so on.

First electronic device 100 includes an enclosure 102 at least partially surrounding a display 104 and one or more buttons 106 or other user input devices formed or positioned on a front surface 108 of first electronic device 100. In some embodiments, the device 100 includes multiple user input devices including the buttons 106 and a touch-sensitive display screen. The user input devices may be used to provide user input to an operating system or other software being executed on the device 100. The user input devices may be operatively coupled to a battery or other power source In some embodiments, the device 100 may also include one or more audio components, including, for example, a microphone and/or a speaker. The one or more audio components may be configured to produce an audio output and/or receive an audio input. In some embodiments, the speaker may be disposed or positioned within the enclosure 102 and electrically coupled to the battery 120 (shown in FIG. 2). Similarly, the microphone may be disposed or positioned within the enclosure 102 and electrically coupled to the battery 120.

The enclosure 102 can form an outer surface or partial outer surface and protective case for the internal components of the first electronic device 100 and may at least partially surround display 104. In some cases, the enclosure 102 defines an opening in which the display 104 is positioned or disposed. The enclosure 102 can be formed from one or more components operably connected together, such as a front piece and a back piece. Alternatively, enclosure 102 can be formed of a single piece connected to or coupled with the display 104. Additionally, enclosure 102 may be formed from a variety of material including, but not limited to: plastic, glass, sapphire, metal, and/or any combination of various materials. Enclosure 102 may also include a frame 110 or bezel portion substantially surrounding and/or outlining display 104. Frame 110 of enclosure 102 may indicate the interactive portion of the display 104 and may be opaque to hide internal components of the first electronic device 100.

Display 104 may be implemented with any suitable technology, including, but not limited to, a liquid-crystal display (LCD) technology, light-emitting diode (LED) technology, organic light-emitting display (OLED) technology, organic electroluminescence (OEL) technology, or another type of display technology. In some embodiments, a multi-touch sensing touchscreen or touch sensor may be incorporated with the display 104. For example, a touchscreen or touch sensor may be positioned over or integrated with the display 104. In a non-limiting example, a substantially transparent cover or sheet may be positioned above the display 104 and/or the touchscreen or touch sensor. In some embodiments, the cover may protect display 104 from contaminants, without significantly obstructing a user's view and/or significantly limit an ability to interact with the touchscreen or touch sensor of the first electronic device 100.

Button 106 may be configured to function as a user input device for first electronic device 100. In some cases, the button 106 may include an actuation component in electronic and/or mechanical communication with the internal components of first electronic device 100, to provide user input and/or allow the user to interact with the various functions of first electronic device 100. In some embodiments, the button 106 may be configured as a single button component surrounded by a portion of the frame 110 of the enclosure 102. As shown in FIG. 1, the button may be positioned relative to an exterior surface of first electronic device 100.

Figure 2:
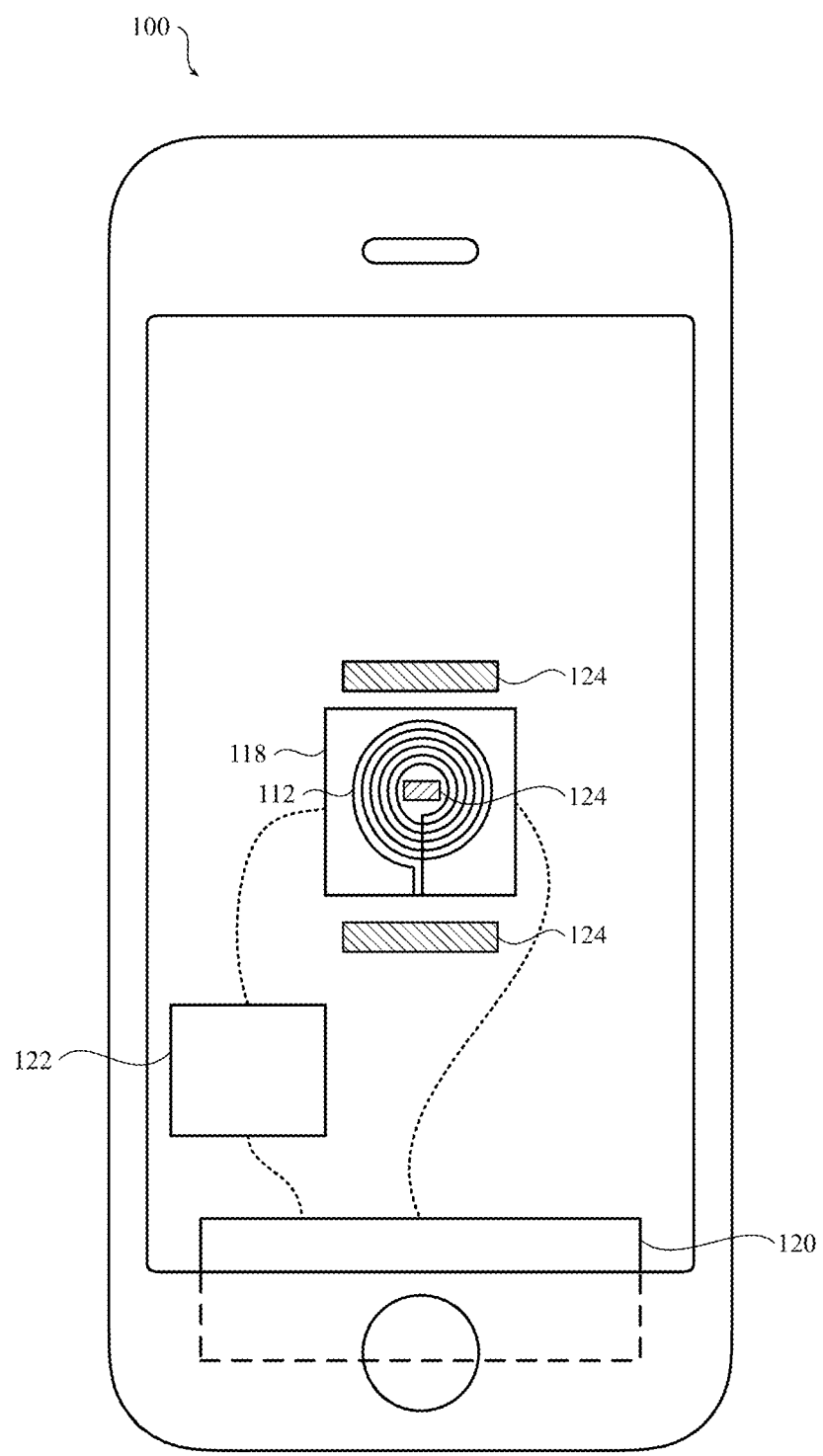
FIG. 2 shows an illustrative view of the first electronic device of FIG. 1 with a display removed, according to embodiments.

As shown in FIGS. 1 and 2, first electronic device 100 may also include at least one inductive coil 112 positioned or disposed within enclosure 102. Specifically, as shown in FIGS. 1 and 2, first electronic device 100 may include a single inductive coil 112 positioned substantially in the center of first electronic device 100 and within the enclosure 102, such that inductive coil 112 is not exposed. Inductive coil 112 may also be positioned under or beneath display 104 of first electronic device 100. As shown in FIG. 1, and discussed herein, inductive coil 112 may be positioned within enclosure 102, and may be in electrical communication with an external inductive coil of an external electronic device through display 104 and/or front surface 108 of first electronic device 100. Additionally as discussed herein, inductive coil 112 may be configured as a two-way coil, a transmit coil for transmitting power from first electronic device 100, and a receive coil for receiving or obtaining power for first electronic device 100. The phantom circle representing inductive coil 112 in FIG. 1 may be merely an example location of the inductive coil 112 within first electronic device 100. The position of the inductive coil 112 may vary within the enclosure 102 and, in some cases, multiple inductive coils 112 may be located within the enclosure 102. As shown in FIG. 1 and described in more detail below with respect to FIG. 2, multiple alignment magnets 124 may also be positioned within the enclosure 102.

FIG. 2 shows a front view of first electronic device 100 with display (item 104 of FIG. 1) omitted to expose an internal cavity of enclosure 102 (shown in FIG. 1). In the non-limiting example shown in FIG. 2, inductive coil 112 may be formed from a conductor, such as a wire that may be concentrically wrapped around to form a set of loops or a spiral shape. The wire may be positioned on or formed on an electrical substrate 118 (e.g., a circuit board), that may be utilized to electrically couple and/or connect the inductive coil 112 to other distinct components of first electronic device 100. The wire forming inductive coil 112 may be formed from various conductive materials, for example metal. However, it is understood that inductive coil 112 of first electronic device 100 may be formed from any suitable material and may be configured in a variety of geometries to allow the transfer of power to or from first electronic device 100, as discussed herein.

First electronic device 100 may also include a battery 120 positioned within enclosure 102. In some embodiments, the battery 120 may be operatively coupled to components of first electronic device 100 to provide electrical power. In some embodiments, the battery 120 is operatively coupled to the display (item 104 of FIG. 1) and/or the controller 122 of first electronic device 100. The battery 120 may also be operatively coupled to a user input device, microphone, speaker, controller, or other component or subsystem of first electronic device 100. As shown in FIG. 2, battery 120 may be positioned within enclosure 102 and may be in electrical communication with or otherwise operatively coupled to the inductive coil 112 of first electronic device 100. As discussed herein, inductive coil 112 may be in electrical communication with battery 120 to transmit power to or from battery 120 to increase the charge of battery 120 or to decrease the charge of battery 120 in order to increase the charge in an external battery of an external electronic device in communication with first electronic device 100. Battery 120 may be utilized to power various components or systems of first electronic device 100.

As shown in FIG. 2, a controller 122 may also be positioned within enclosure 102 of first electronic device 100. Controller 122 may be in electrical communication with inductive coil 112 of first electronic device 100 to control the operational mode of inductive coil 112. That is, controller 122 may be in electrical communication with inductive coil 112 to adjust the operational mode between a power receiving mode or a power transmitting mode. When inductive coil 112 is adjusted to a power receiving mode, inductive coil 112 may be configured as a receiving coil and may receive power to increase a charge of battery 120. In power transmitting mode, inductive coil 112 may be configured as a transmit coil, and may transmit power from first electronic device 100, which may decrease the charge of battery 120 and/or draw power from an external source, such as a wall outlet.

Also shown in FIG. 2, controller 122 may be coupled to or in electrical communication with battery 120 for monitoring the charge of battery 120. Although not shown, controller 122 may be in electrical communication with distinct internal components of first electronic device 100. In a non-limiting example, controller 122 may be coupled to a larger computing or processing system that may control the functionality of first electronic device 100. In another non-limiting embodiment, controller 122 may be integrated with and/or may be configured as a portion of a larger computing or processing system of first electronic device 100. Controller 122 may be formed from any suitable electronic component that may be configured to adjust the operational mode of inductive coil 112 and/or may monitor the charge of battery 120, such as, a microcontroller or a microprocessor.

As shown in FIG. 2, first electronic device 100 may also include at least one alignment magnet 124 positioned adjacent inductive coil 112. As shown in FIGS. 1 and 2, first electronic device 100 may include a group of alignment magnets 124 positioned adjacent to inductive coil 112 of first electronic device 100. Two alignment magnets 124 may be positioned on opposite sides or ends of inductive coil 112. Additionally, an alignment magnet 124 may be positioned within the center of inductive coil 112, such that the wires of inductive coil 112 substantially surround alignment magnet 124 of first electronic device 100. Attractive forces between the alignment magnets 124 of first electronic device 100 and magnets of an external device may be used to align inductive coil 112 with an external inductive coil of the external electronic device, which may facilitate the transmission of power between inductive coil 112 and the external inductive coil. Alignment magnets 124 may be formed from any suitable material that has magnetic or electromagnetic properties.

Figure 3:
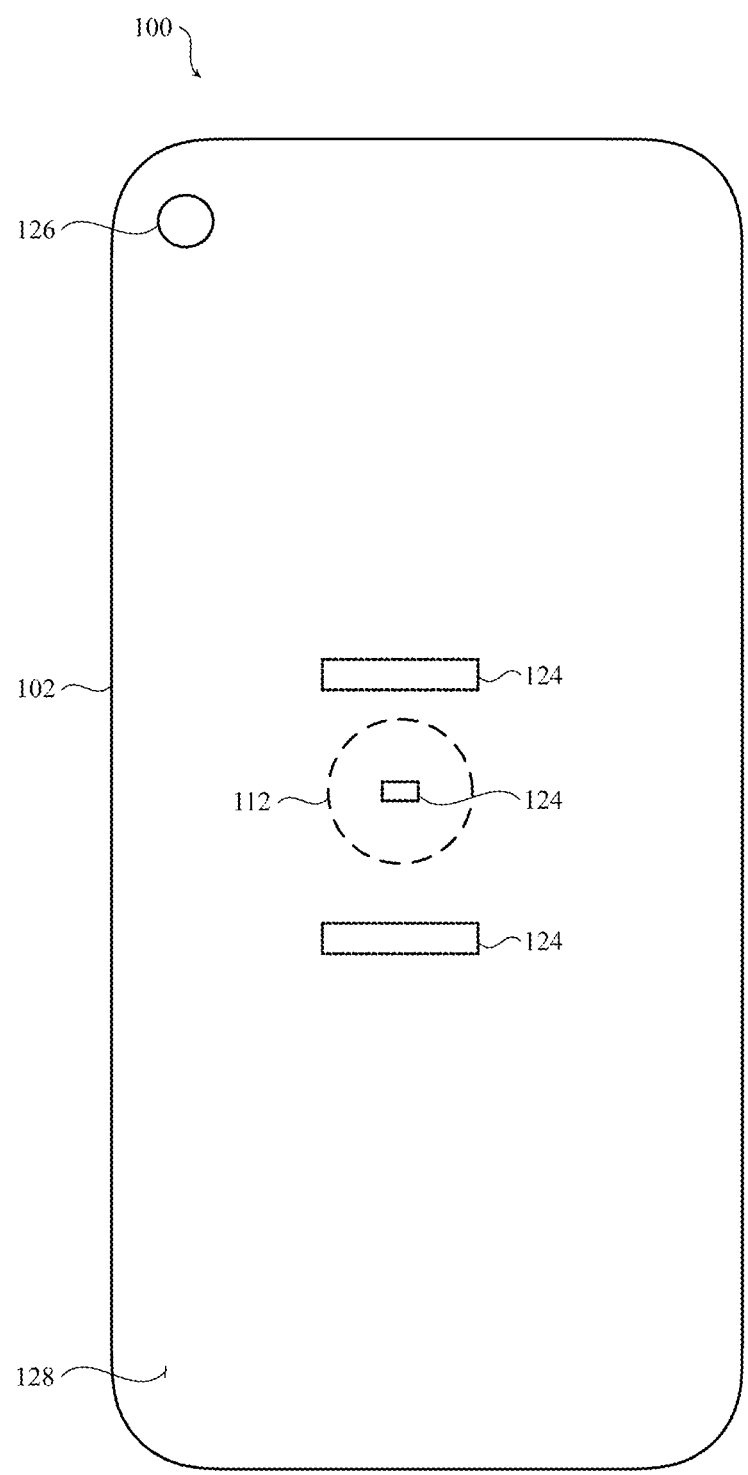
FIG. 3 shows an illustrative back view of the first electronic device of FIG. 1, according to embodiments.

FIG. 3 shows a back view of first electronic device 100. First electronic device 100 may have a camera 126 positioned on back surface 128. That is, camera 126 may be positioned on back surface 128 (opposite front surface 108 having display 104 of first electronic device 100, as depicted in FIG. 1). Camera 126 may include any suitable camera device and/or system that may take photos and/or videos using first electronic device 100.

As shown in FIG. 3, and discussed herein with respect to FIG. 1, inductive coil 112 may be positioned within enclosure 102. As discussed herein, inductive coil 112 may be in electrical communication with an external inductive coil of an external electronic device through back surface 128 of first electronic device 100. For example, the inductive coil 112, positioned within enclosure 102, may be configured to be wirelessly and inductively coupled with an external electronic device through back surface 128 of electronic device. As shown in FIG. 3, one or more alignment magnets 124 may also be disposed relative to back surface 128 of first electronic device 100.

Figure 4A:
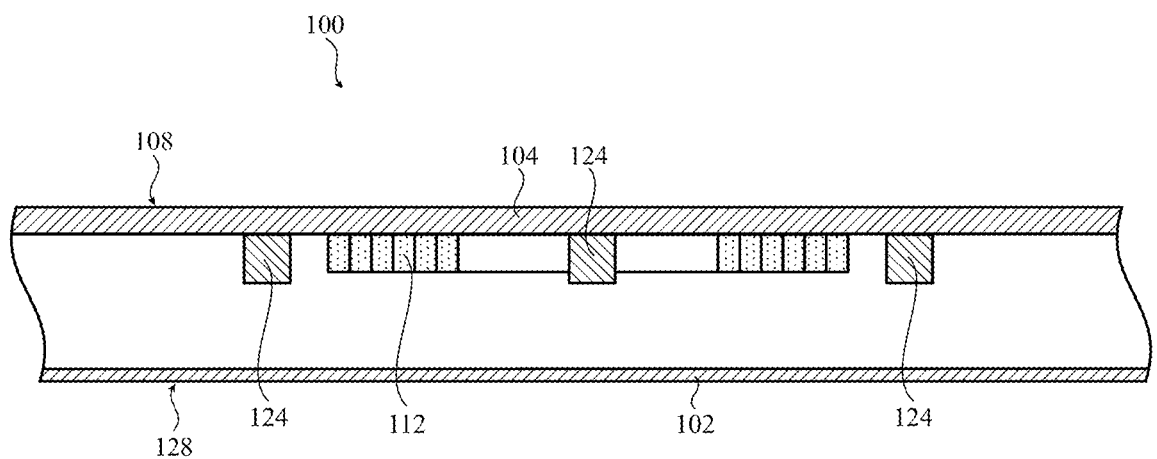
FIGS. 4A-4C show an illustrative side cross-sectional view of a portion of the first electronic device of FIG. 1 taken along line 4-4, according to embodiments.
Figure 4B:
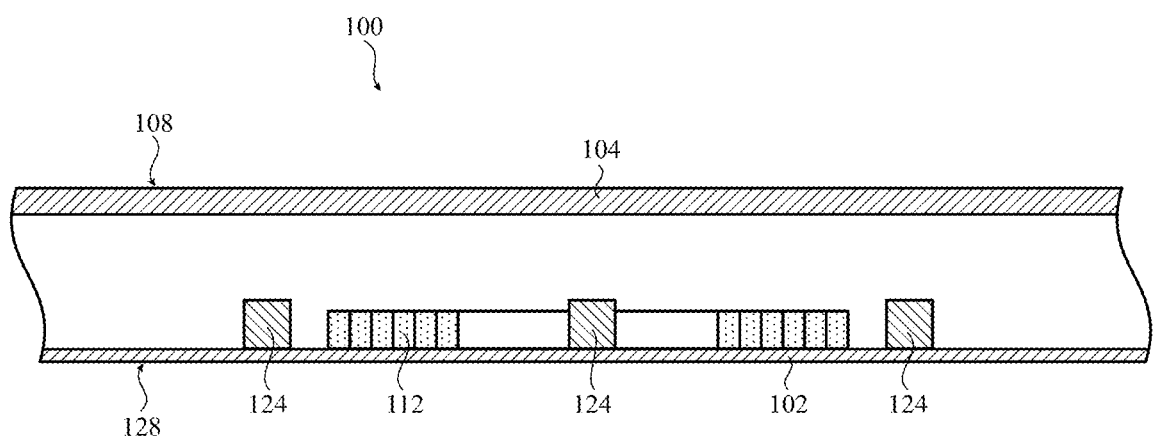
Figure 4C:
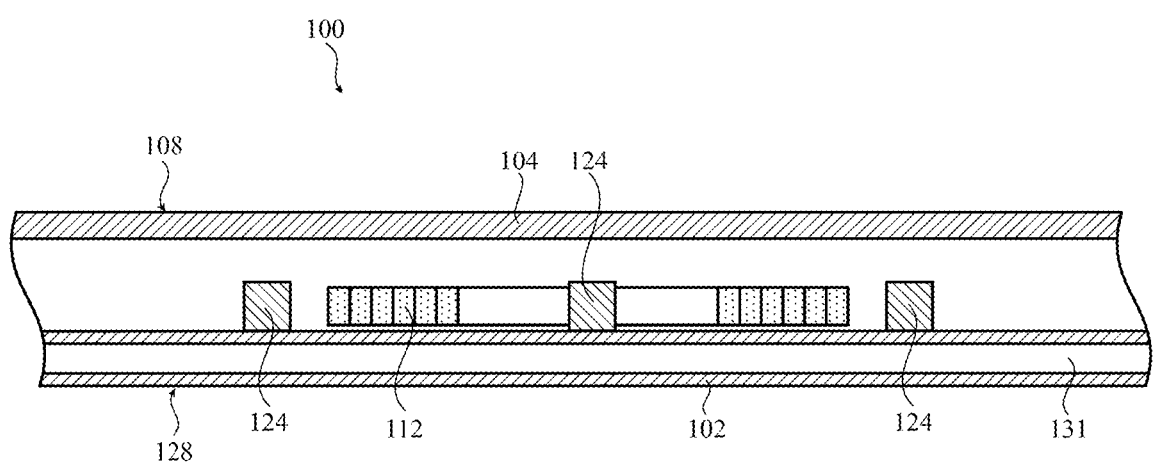

FIGS. 4A-4C depict cross-sectional side views of first electronic device 100 including inductive coil 112. Inductive coil 112 and alignment magnets 124 may be positioned in a variety of positions within enclosure 102 of first electronic device 100. In a non-limiting embodiment shown in FIG. 4A, inductive coil 112 and alignment magnets 124 may be coupled directly to display 104 of first electronic device 100, adjacent front surface 108. When positioned adjacent front surface 108 and/or coupled to display 104, inductive coil 112 may provide an increased power transmission to an external inductive coil in an external electronic device when front surface 108 is positioned directly adjacent to the external inductive coil, as discussed herein. However, it is understood that inductive coil 112 coupled to display 104 may still transmit power through back surface 128 of first electronic device 100.

In another non-limiting embodiment shown in FIG. 4B, inductive coil 112 and alignment magnets 124 may be coupled directly to enclosure 102 of first electronic device 100. As shown in FIG. 4B, inductive coil 112 and alignment magnets 124 may be coupled to enclosure 102 adjacent back surface 128, and opposite display 104 and/or front surface 108. Inductive coil 112 positioned adjacent back surface 128 may transmit power through display 104 of first electronic device 100. However, inductive coil 112 may transmit an increased amount of power through back surface 128, when compared to the power transmission through display 104 and/or front surface 108.

In an additional non-limiting embodiment shown in FIG. 4C, inductive coil 112 and alignment magnets 124 may be positioned between, and offset from, the front surface 108 and back surface 128. In some embodiments, the inductive coil 112 and alignment magnets 124 may be positioned on or relative to an internal structure, such as a mid plate 131 as shown in FIG. 4C. In some cases, the inductive coil 112 and alignment magnets 124 may be positioned between front surface 108 and back surface 128 such that power transmission from and/or to inductive coil 112 may be approximately equal through front surface 108 and back surface 128.

The examples of FIGS. 4A-C depict the alignment magnets 124 and the inductive coil 112 as being substantially aligned or planar. However, it is understood that alignment magnets 124 may be positioned within a portion of enclosure 102 that is distinct or non-planar with respect to inductive coil 112. In a non-limiting example, not shown, inductive coil 112 may be directly adjacent to front surface 108 and/or display 104, and alignment magnets 124 may be directly adjacent to back surface 128. In the non-limiting embodiment, and as discussed herein, alignment magnets 124 may facilitate alignment of inductive coil 112 and an external inductive coil of an external electronic device to provide an optimum power transmission between first electronic device 100 and an external electronic device.

Figure 5A:
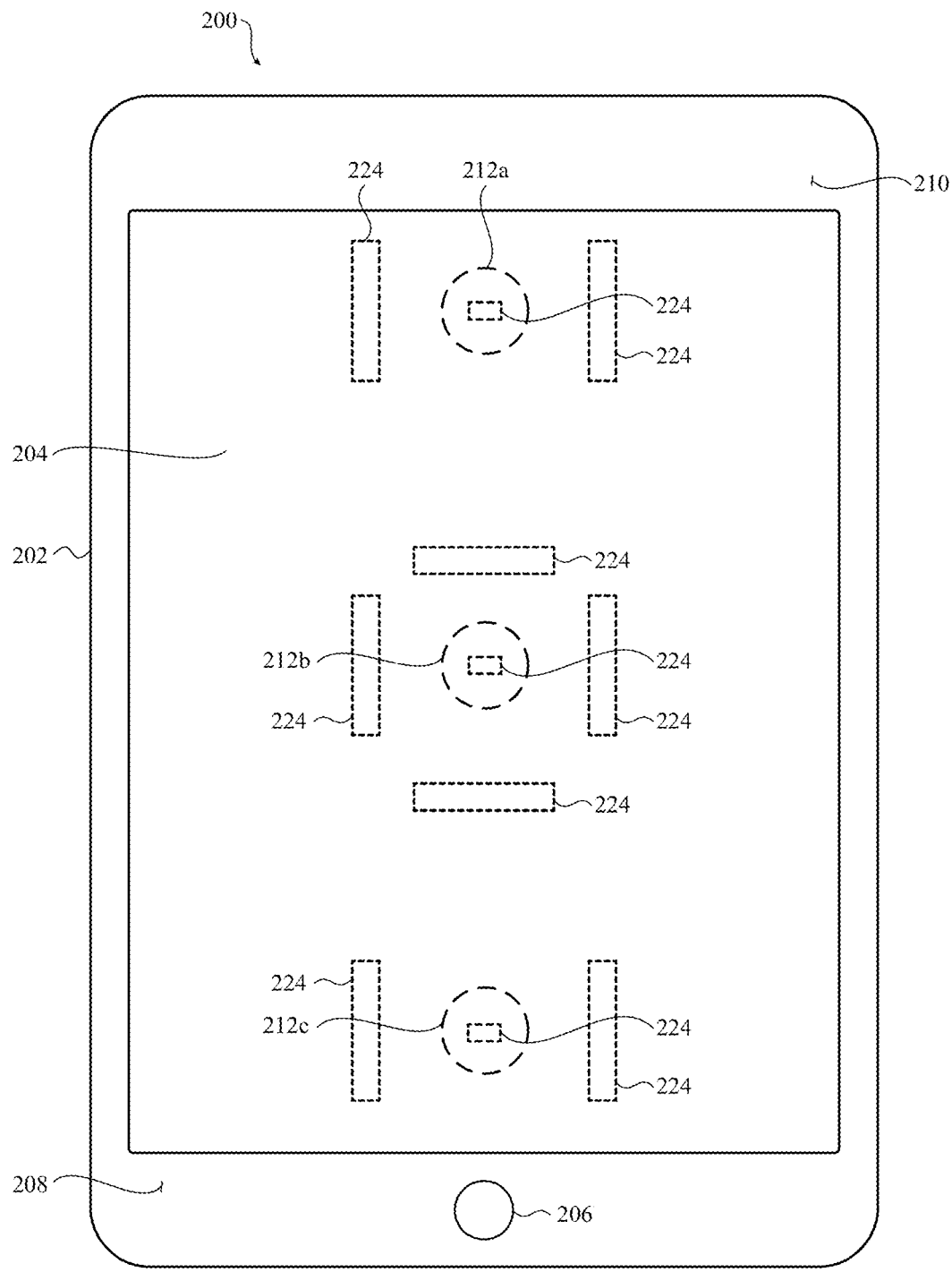
FIG. 5A shows an illustrative front view of a second electronic device including a group of inductive coils, according to embodiments.
Figure 5B:
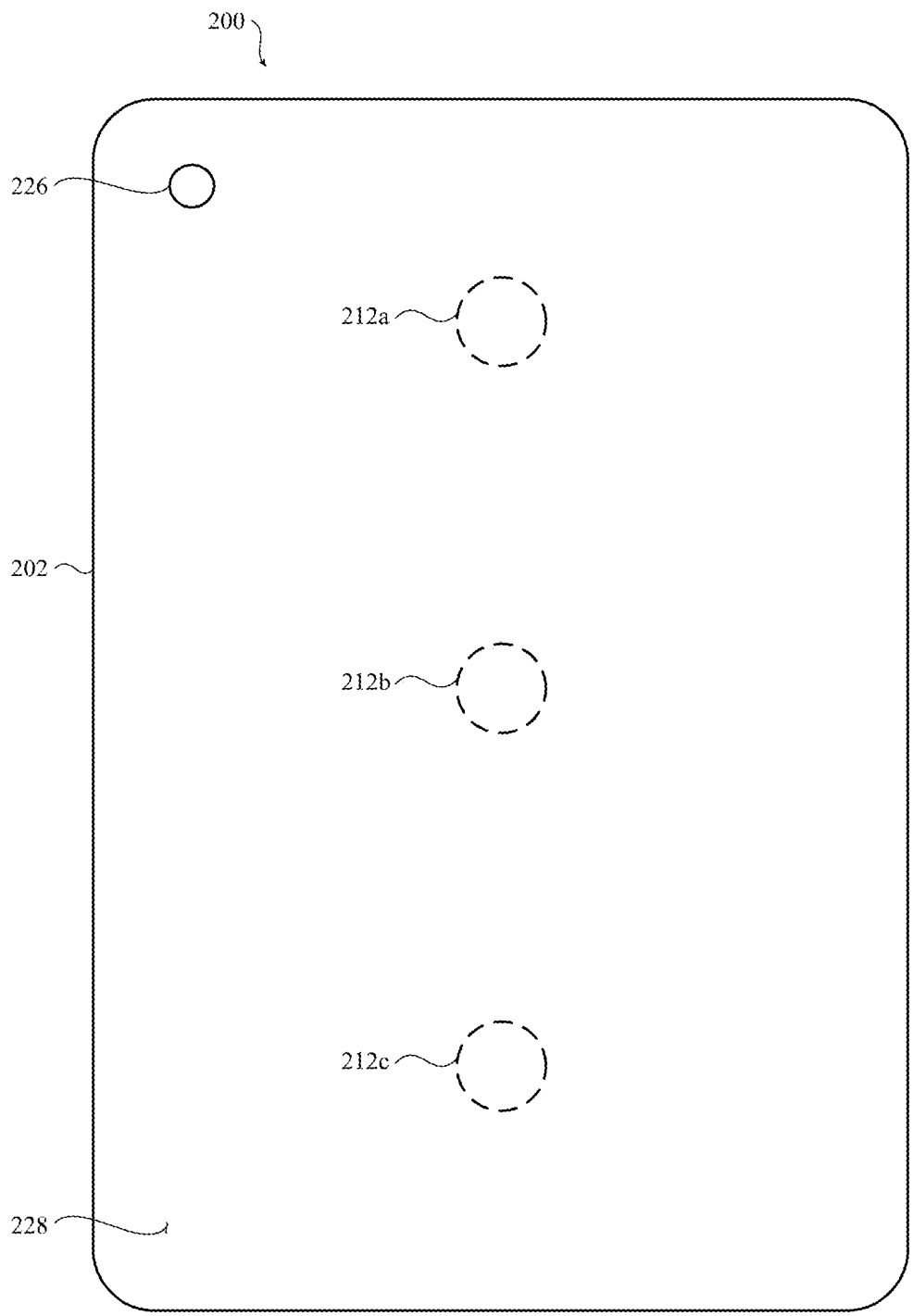
FIG. 5B shows an illustrative back view of the second electronic device of FIG. 5A, according to embodiments.

FIGS. 5A and 5B show front and back views, respectively, of second electronic device 200 including inductive coils 212a, 212b, 212c. In a non-limiting example embodiment as shown in FIGS. 5A and 5B, second electronic device 200 may be formed as a tablet computing device. Second electronic device 200 may include substantially similar components as first electronic device 100, such as enclosure 202, display 204, camera 226, button 206 and other user input devices, and the like. Second electronic device 200 may also include an audio element, such as a speaker and/or a microphone. It is understood that similarly numbered and/or named components may function in a substantially similar fashion. Redundant explanation of these components has been omitted for clarity.

Second electronic device 200 may include a group of inductive coils 212a, 212b, 212c positioned or disposed within enclosure 202. As shown in FIGS. 5A and 5B, the group of inductive coils 212a, 212b, and 212c may be positioned throughout enclosure 202. In a non-limiting example, each of the group of inductive coils 212a, 212b, and 212c may be positioned within the boundaries of display 204, and/or within frame 210 of electronic device 200. Additionally, in a non-limiting example, as shown in FIGS. 5A and 5B, the group of inductive coils 212a, 212b, and 212c may be evenly spaced and positioned substantially in the center of second electronic device 200 and inductive coil 212b may be positioned between inductive coils 212a, 212c.

As shown in FIG. 5A, second electronic device 200 may also include a group of alignment magnets 224 positioned adjacent each of the group of inductive coils 212a, 212b, 212c. Similar to FIGS. 1-3, inductive coils 212a, 212c may have two alignment magnets 224 positioned on opposite sides of inductive coils 212a, 212c, and an alignment magnet 224 positioned within and/or surrounded by inductive coils 212a, 212c. As shown in FIG. 5A, alignment magnets 224 in second electronic device 200 may be positioned on opposite sides of the inductive coils 212a, 212c.

In a non-limiting example, the inductive coil 212b may include four distinct alignment magnets 224. As shown in FIG. 5A, four distinct alignment magnets 224 may substantially surround inductive coil 212b on four sides. As discussed herein, the inclusion of four distinct alignment magnets 224 in second electronic device 200 may allow an external electronic device to be coupled to second electronic device 200 and/or alignment magnets 224 in multiple orientations or positions.

Figure 6A:
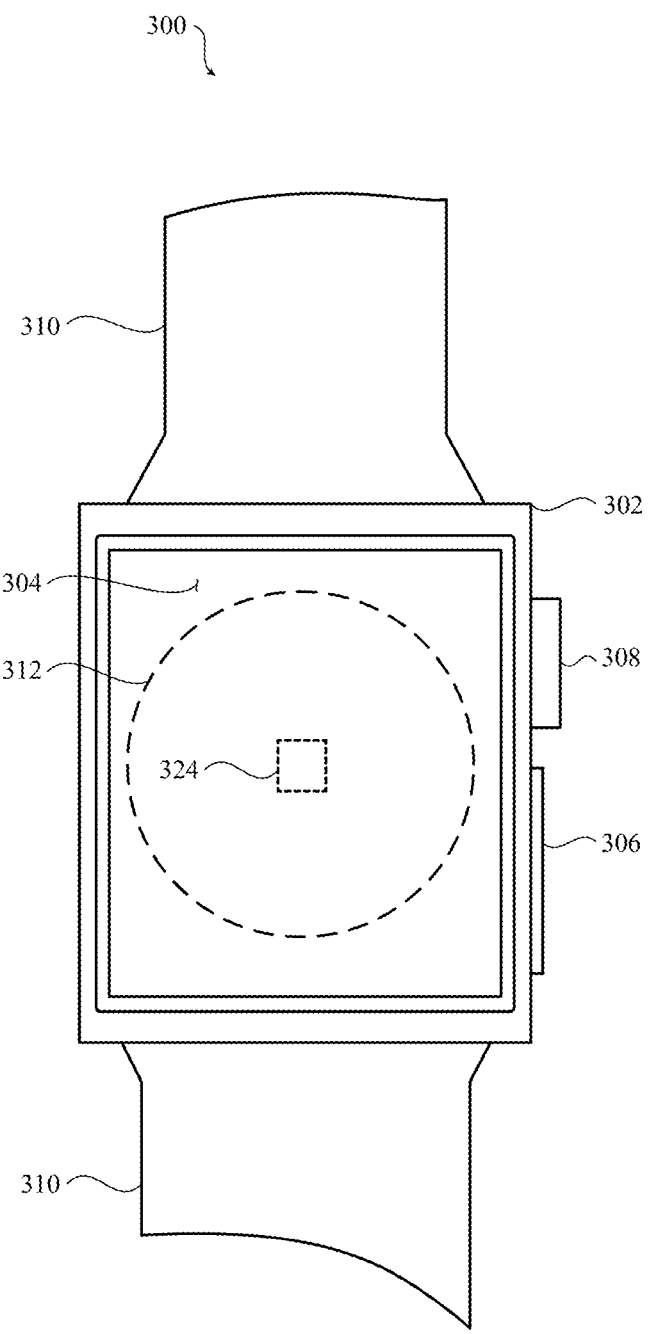
FIG. 6A shows an illustrative front view of a third electronic device including an inductive coil, according to embodiments.
Figure 6B:
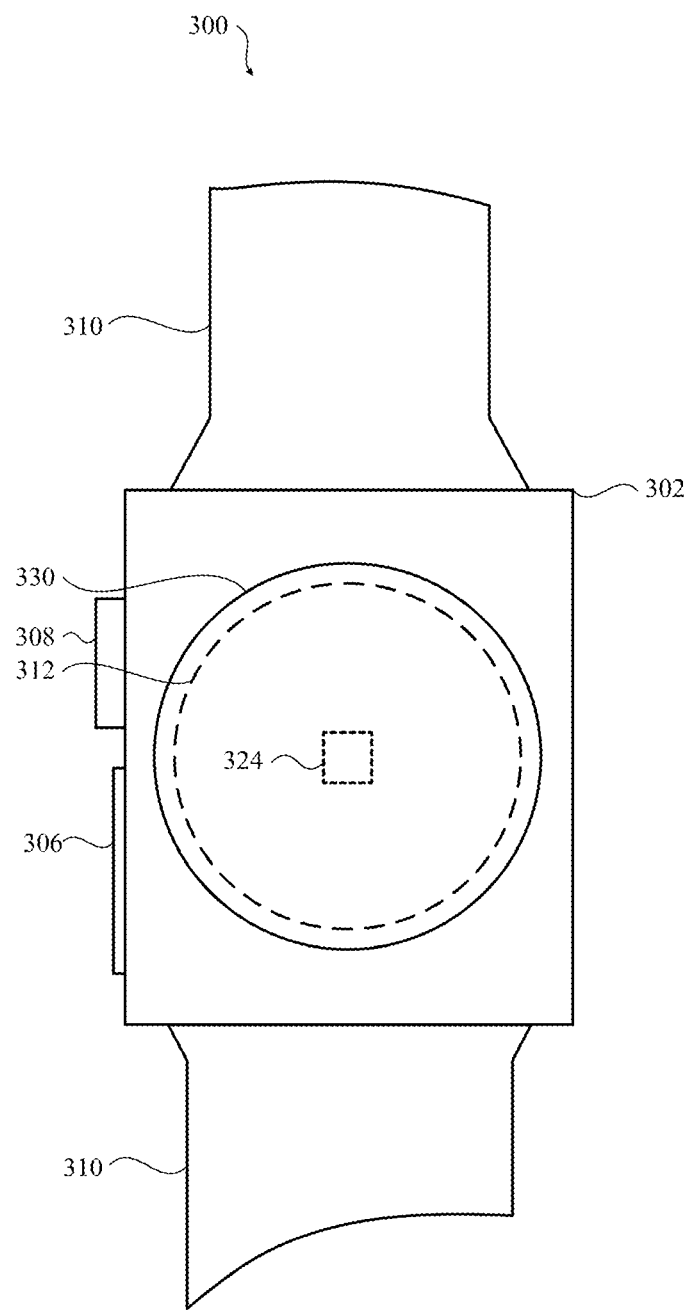
FIG. 6B shows an illustrative back view of the third electronic device of FIG. 6A, according to embodiments.

FIGS. 6A and 6B show a top and bottom view, respectively, of a third electronic device 300. Third electronic device 300 may be a portable or wearable electronic device 300, including a health monitoring device (hereafter, "third electronic device"). Third electronic device 300, as shown in FIGS. 6A and 6B, may be configured to provide health-related information or data such as but not limited to heart rate data, blood pressure data, temperature data, oxygen level data, diet/nutrition information, medical reminders, health-related tips or information, or other health-related data. Third electronic device 300 may optionally convey the health-related information to a separate electronic device such as a tablet computing device, phone, personal digital assistant, computer, and so on. Additionally or alternatively, the third electronic device 300 may provide additional information, such as, but not limited to, time, date, health, statuses, or externally connected or communicating devices, and/or software executing on such devices, messages, video, operating commands, and so forth (and may receive any of the foregoing from an external device in addition to other communications).

Third electronic device 300 may include an enclosure 302 at least partially surrounding a display 304 and one or more buttons 306, crowns 308 or input devices. The enclosure 302 may form an outer surface or partial outer surface and protective case for the internal components of third electronic device 300, and may at least partially surround the display 304. The enclosure 302 may include an opening in which the display 304 is positioned or disposed. The enclosure 302 may be formed of one or more components operably connected together, such as a front piece and a back piece. Alternatively, the enclosure 302 may be formed of a single piece connected to or coupled with the display 304. Enclosure 302 may be formed from one or more materials including, but not limited to: plastic, glass, sapphire, metal, and/or other various materials or combinations of materials.

Third electronic device 300 may also have a wearable band 310 (partially shown in FIGS. 6A and 6B) coupled to enclosure 302. Wearable band 310 may be used to secure third electronic device 300 to a user, or any other object capable of receiving electronic device 300. In a non-limiting example where third electronic device 300 is a watch, wearable band 310 may secure the watch to a user's wrist. In other non-limiting examples, third electronic device 300 may secure the watch to or within another part of a user's body.

Display 304 may be implemented with any suitable technology, including, but not limited to, liquid-crystal display (LCD) technology, light-emitting diode (LED) technology, organic light-emitting display (OLED) technology, organic electroluminescence (OEL) technology, or another type of display technology. In some embodiments, the display 304 may also include a multi-touch sensing touchscreen and/or a touch sensor that is configured to receive touch input from the user. In some embodiments, the touch screen or touch sensor is incorporated with the display 304 and may be, for example, disposed above or integrated with the display 304.

The third electronic device 300 also includes one or more user input devices, including button 306, crown 308, and/or a touch sensor disposed relative to or positioned on an exterior surface of third electronic device 300. In some cases, the button 306 and/or crown 308 may include an actuation component in electronic and/or mechanical communication with the internal components of third electronic device 300 to provide user input and/or allow the user to interact with the various functions of third electronic device 300. Button 306 may likewise include a sensor, such as a biometric sensor, touch sensor, or the like. Crown 308 may be a rotatable and/or actuated input device for interacting with third electronic device 300. Third electronic device 300 may also include other forms of user I/O including an audio element, such as a speaker and/or a microphone.

As shown in FIGS. 6A and 6B, third electronic device 300 may also include an inductive coil 312. Third electronic device 300 may include a single inductive coil 312 positioned within enclosure 302. As shown in FIGS. 6A and 6B and as discussed herein, inductive coil 312 may be in electrical communication (e.g., wirelessly coupled) through display 304 (see, FIG. 6A) and/or through the back charging plate 330 (see, FIG. 6B) of third electronic device 300.

Third electronic device 300 may also include a single alignment magnet 324. As shown in FIGS. 6A and 6B, the single alignment magnet 324 may be positioned within and/or may be substantially surrounded by inductive coil 312 of third electronic device 300. As a result of the size of third electronic device 300, only a single alignment magnet 324 may be included within electronic device 300. However, it is understood that third electronic device 300 may include a group of alignment magnets 324.

Figure 7A:
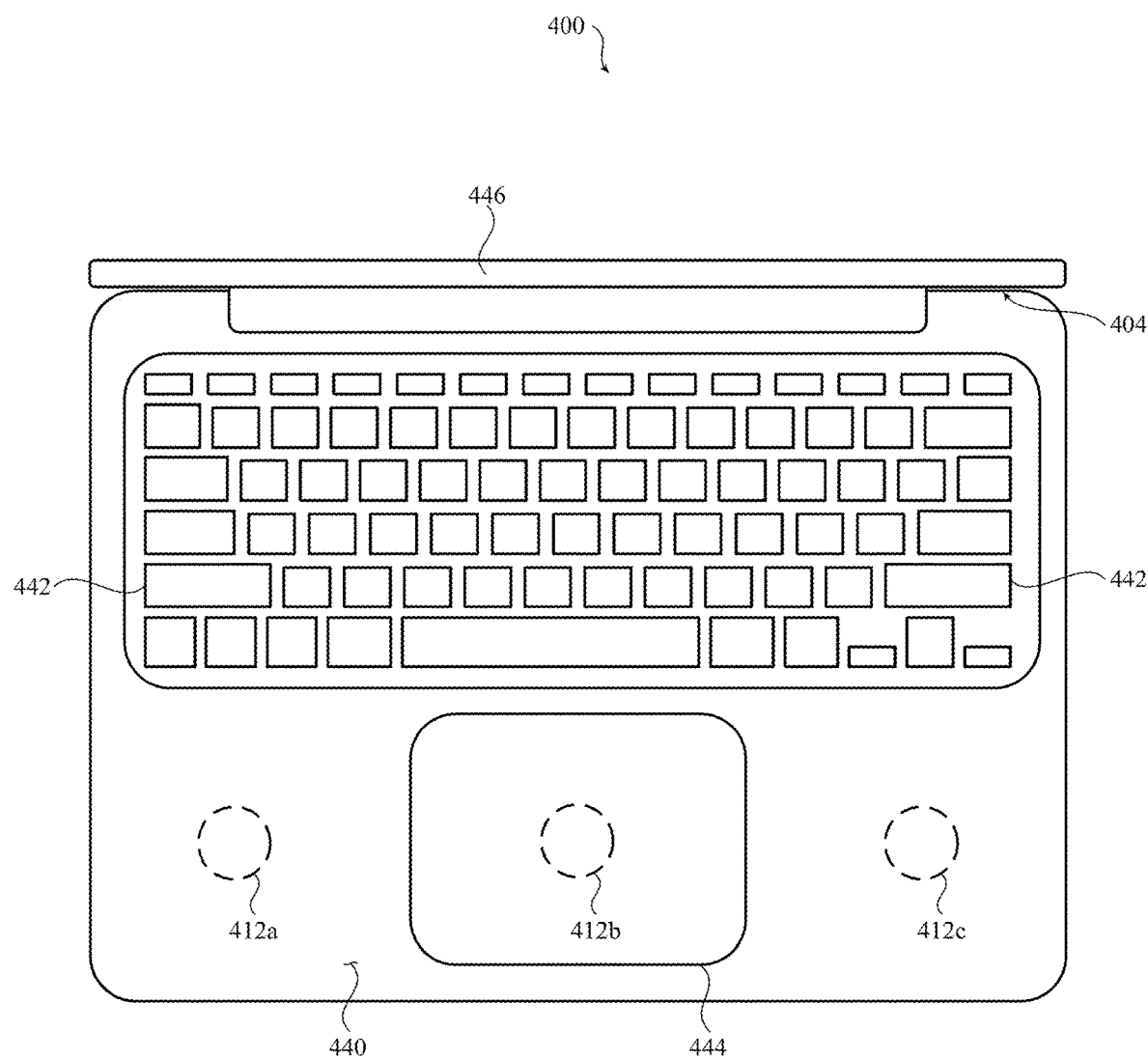
FIG. 7A shows an illustrative top view of a fourth electronic device including a group of inductive coils, according to embodiments.

FIG. 7A shows a top view of a fourth electronic device 400. In a non-limiting example embodiment as shown in FIG. 7A, fourth electronic device 400 may be formed as a portable computing device, such as a notebook computer. Fourth electronic device 400 may have an enclosure or top case 440 for housing and/or protecting the internal components of fourth electronic device 400. Fourth electronic device 400 may also have a group of keys 442 protruding through top case 440 forming a keyboard user input device. The group of keys 442 may be utilized to allow a user to interact with fourth electronic device 400. A track pad 444 may also be positioned within top case 440 of fourth electronic device 400. Track pad 444 may be positioned adjacent the group of keys 442 of fourth electronic device 400. Track pad 444, like the group of keys 442, may allow a user to interact with fourth electronic device 400. Fourth electronic device 400 may also include other components for performing user I/O including an audio element, such as a speaker and/or a microphone.

Fourth electronic device 400 may also include a display 404 and a display case 446. Display case 446 may form an exterior housing and/or protective enclosure for display 404 of fourth electronic device 400. Display 404 may provide a visual output to a user of fourth electronic device 400.

Fourth electronic device 400 may also include a group of inductive coils 412a, 412b, 412c positioned within top case 440. As shown in FIG. 7A, the group of inductive coils 412a, 412b, 412c may be evenly spaced within top case 440, adjacent the group of keys 442. Inductive coils 412a, 412c may be positioned on either side of track pad 444 and inductive coil 412b may be positioned below and/or aligned with track pad 444. Each of the group of inductive coils 412a, 412b, and 412c may be in electrical communication with external inductive coils of an external electronic device through top case 440, as discussed herein.

Figure 7B:
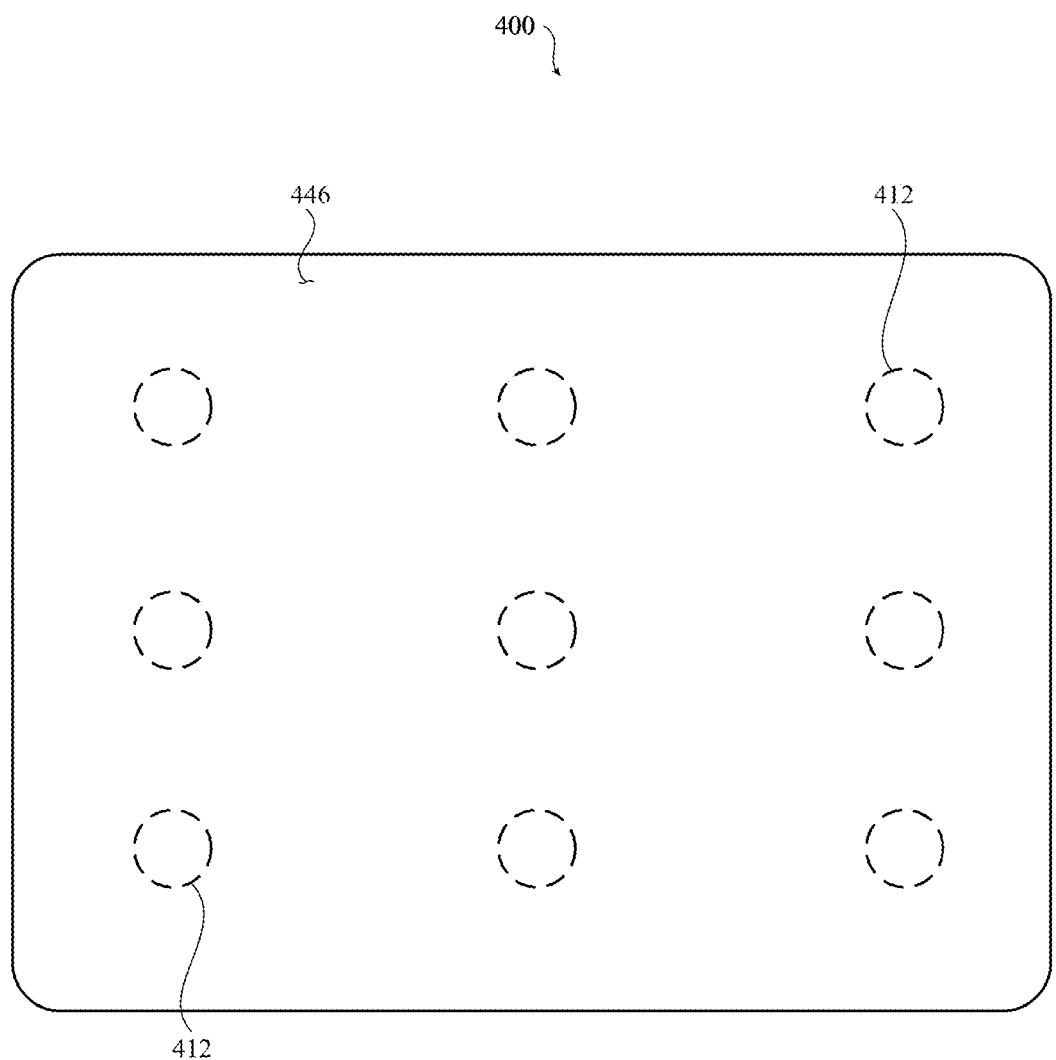
FIG. 7B shows an illustrative top view of the fourth electronic device of FIG. 7A in a closed configuration, according to embodiments.

FIG. 7B shows a top view of fourth electronic device 400 in a closed configuration. In a closed configuration, display case 446 may be coupled to top case 440 of fourth electronic device 400 and may substantially cover the group of keys 442. As shown in FIG. 7B, display case 446 may also include a group of inductive coils 412. The inductive coils 412 positioned within display case 446 may be positioned between display 404 (see, FIG. 7A) and the outer surface of display case 446. The group of inductive coils 412 positioned within display case 446 may be evenly distributed through display case 446. As similarly discussed herein, each of the group of inductive coils 412 within display case 446 may be in electrical communication with external inductive coils of an external electronic device through display case 446, as discussed herein.

Fourth electronic device 400 may or may not include alignment magnets. In the non-limiting embodiments shown in FIGS. 7A and 7B, fourth electronic device 400 does not include alignment magnets. In other non-limiting examples, not currently depicted, each of the inductive coils 412 of fourth electronic device 400 may include at least one alignment magnet. As discussed herein, the alignment magnets that may be formed within fourth electronic device 400 may be utilized to align external inductive coils of an external electronic device with inductive coils 412 of fourth electronic device 400.

Figure 8:
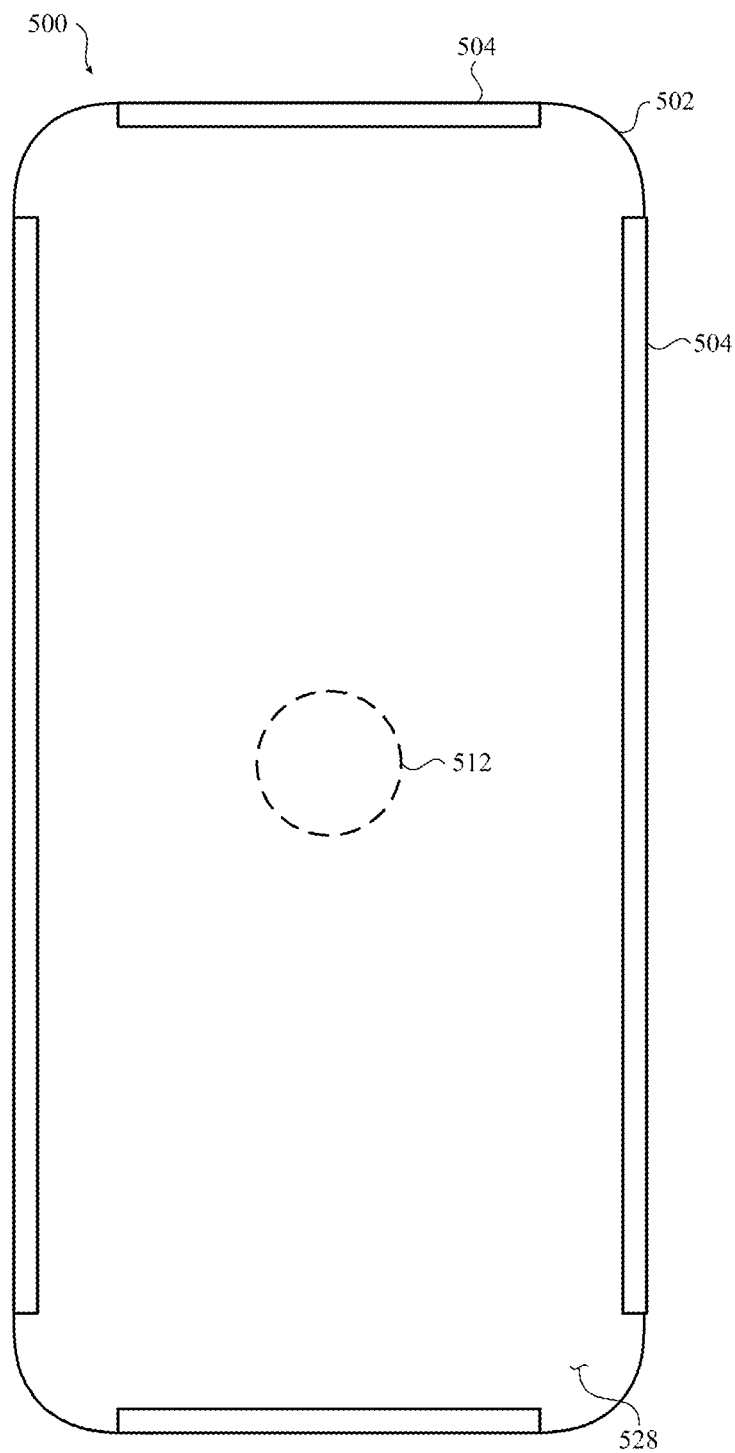
FIG. 8 shows an illustrative front view of a fifth electronic device, according to embodiments.

FIG. 8 shows a front view of a fifth electronic device 500. Fifth electronic device 500 may be a protective case or cover for a mobile phone or other portable electronic device. Fifth electronic device 500 may be configured to at least partially surround an enclosure of a portable electronic device and provide additional protection against physical impact, abrasive contact, exposure to water, and/or other potentially damaging events. Thus, fifth electronic device 500 is typically used as an accessory and paired with another, separate portable electronic device to provide protection.

Fifth electronic device 500 may include an enclosure 502 that is configured to at least partially surround another, separate portable electronic device. The enclosure 502 may form an outer surface or partial outer surface and protective case for the internal components of fifth electronic device 500 and the separate portable device that is installed or positioned within fifth electronic device 500. The enclosure 502 may include one or more coupling features 504 that are configured to engage with the separate portable device that is installed or positioned within fifth electronic device 500. The coupling features 504 may include spring-loaded or compliant clips that are configured to attach a separate portable device to fifth electronic device 500. The coupling features 504 may also provide an alignment or fixed positioning of the two devices with respect to each other.

The enclosure 502 may be formed of one or more components operably connected together, such as a front piece and a back piece. The one or more components of the enclosure 502 may form a cavity or recess in which the internal components are positioned. Fifth electronic device 500 may be formed from materials and components that are particularly suited for withstanding a drop event when another portable electronic device, such as a mobile phone, is installed or inserted into fifth electronic device 500. Enclosure 502 may be formed from a group of distinct materials including, but not limited to: plastic, elastomer, carbon composite, metal, and/or other various materials or combinations of materials.

Fifth electronic device 500 may also include one or more user input devices, including buttons, keys, or a touch sensor disposed relative to or positioned on an exterior surface of the enclosure 502. Fifth electronic device 500 may also include one or more mechanical actuators that are configured to translate user input to an actuator or user-input device located on the separate electronic device that is installed or held within fifth electronic device 500. In some alternative embodiments, fifth electronic device 500 includes a keyboard or other user input device similar to the group of keys 442 of the keyboard of fourth electronic device 400 depicted in FIG. 7A.

As shown in FIG. 8, fifth electronic device 500 may also include an inductive coil 512 that is configured to transmit and/or receive wireless power to/from another device. The inductive coil 512 is positioned within enclosure 502 and may be operatively coupled to an internal battery and/or other electronic circuitry. The inductive coil 512 may be in electrical communication (e.g., wirelessly coupled) through the surface 528 of fifth electronic device 500.

Although not shown in FIGS. 5A-8, it is understood that each of electronic devices 200, 300, 400, 500 may include a controller and a battery as similarly discussed herein with respect to first electronic device 100 in FIG. 2. That is, second electronic device 200, third electronic device 300, fourth electronic device 400, and fifth electronic device 500 may also include a controller for adjusting the operational mode of the inductive coil(s) in the electronic device and battery for powering the electronic device.

FIGS. 9A-21 depict various embodiments of at least two electronic devices in electrical communication for transmitting power between the electronic devices and/or for inductively charging one electronic device by another electronic device. In the following examples, reference may be made to two (or more) inductive coils that are aligned or substantially aligned with each other. In some cases, only a single outline or shape may be depicted in a corresponding figure, which may represent the two (or more) inductive coils. In these cases, multiple item numbers may refer to the same outline or shape, although it is understood that there are actually the two (or more) inductive coils in the same aligned position but positioned in different planes of their corresponding devices. Multiple concentric or overlapping shapes that may correspond to the separate inductive coils are omitted for clarity.

Figure 9A:
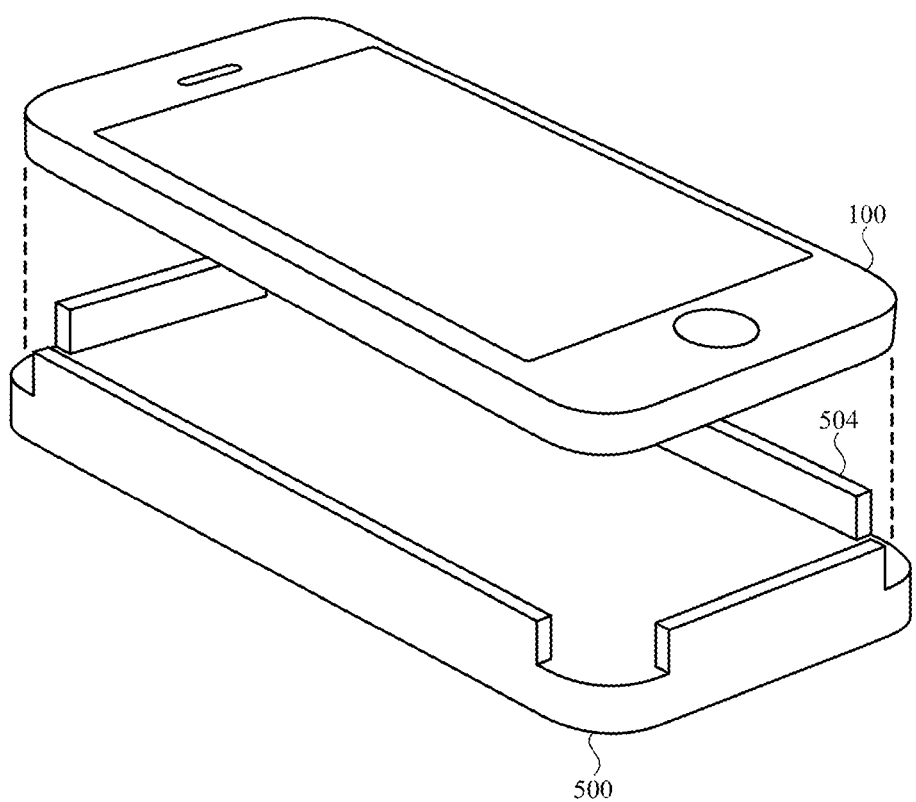
FIG. 9A shows an illustrative view of the first electronic device of FIG. 1 being inserted into the fifth electronic device of FIG. 8, according to some embodiments.
Figure 9B:
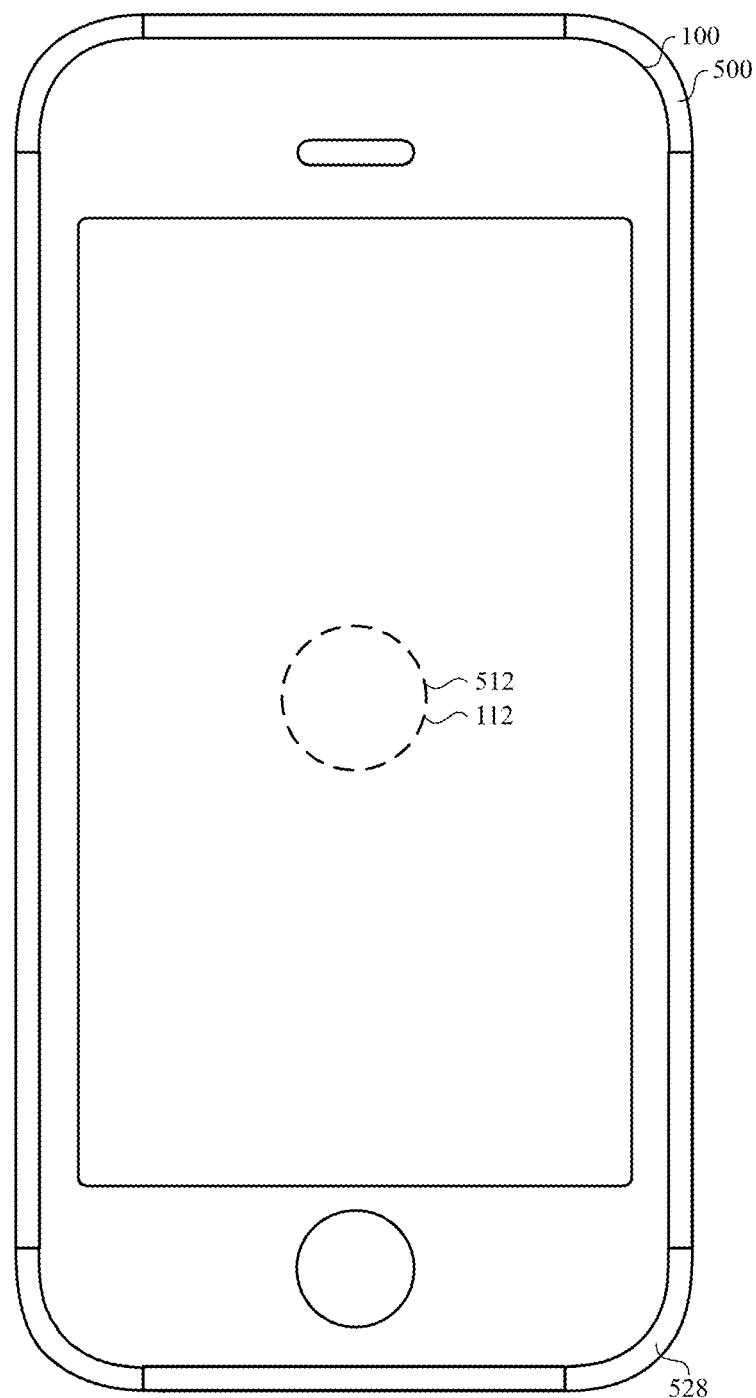
FIG. 9B shows an illustrative front view of the first electronic device of FIG. 1 positioned within the fifth electronic device of FIG. 5A, according to embodiments.

FIGS. 9A and 9B depict first electronic device 100 and fifth electronic device 500 which may be coupled to wirelessly exchange power with each other using a pair of inductive coils. In the examples of FIGS. 9A and 9B, fifth electronic device 500 may form a protective cover or case for a separate portable device, such as first electronic device 100. FIG. 9A depicts first electronic device 100 being installed or positioned within fifth electronic device 500. In some implementations, first electronic device 100 may be installed by pressing the first electronic device 100 into the coupling features 504 of fifth electronic device 500. The coupling features 504 may secure the two devices together as well as provide alignment between the devices.

FIG. 9B depicts a top view of first electronic device 100 positioned within fifth electronic device 500. First electronic device 100 may be in electrical communication with fifth electronic device 500. Back surface 128 (see FIG. 3) of first electronic device 100 may be positioned on and/or may contact the surface 528 of fifth electronic device 500. When positioned on the surface 528 of fifth electronic device 500, inductive coils 112 of first electronic device 100 may be aligned with and/or in electrical communication with inductive coil 512 of fifth electronic device 500. When in electrical communication, the respective inductive coils 112, 512 may transmit power between the electronic devices 100, 500.

In order to transmit power between electronic devices 100, 500, the operational modes of the electrically communicative inductive coils 112, 512 may be distinct from one another. In the non-limiting example, as shown in FIG. 9B, electronic device 500 may transmit power to electronic device 100. In the non-limiting example, inductive coil 112 of electronic device 100 may be in power receiving mode, and may act as a receiving coil. Additionally, inductive coil 512 of electronic device 500, in electrical communication with inductive coil 112, may be in a power transmitting mode, and may act as a transmitting coil. Once in electrical communication via inductive coils 112, 512, fifth electronic device 500 may provide power to first electronic device 100. As a result of providing power from fifth electronic device 500 to first electronic device 100, a charge of battery 120 of first electronic device 100 (see, FIG. 2) may increase while a charge of the battery of fifth electronic device 500 (not shown) may decrease. The power provided to first electronic device 100 for charging battery 120 may be provided from the battery of fifth electronic device 500.

Figure 10:
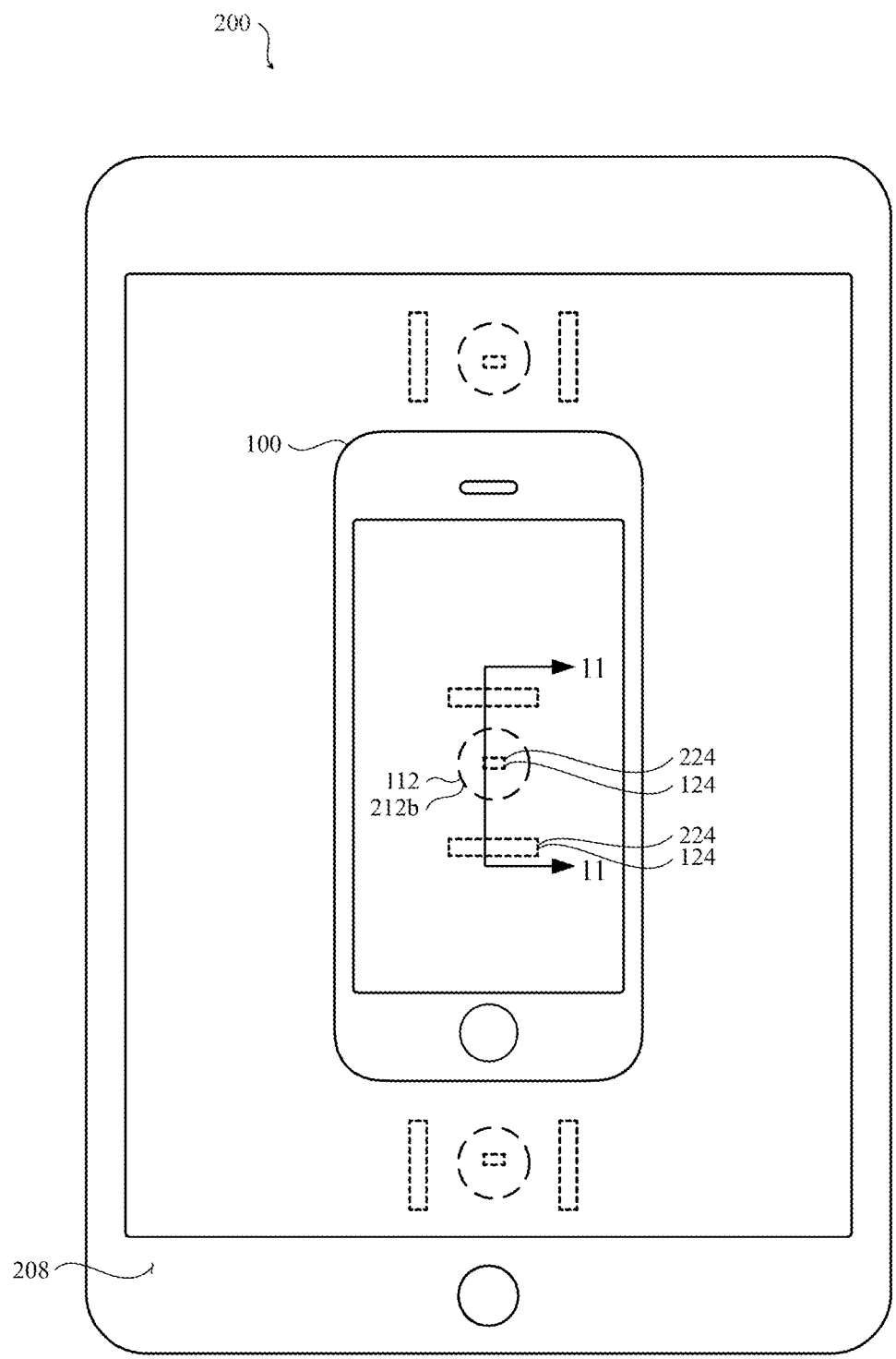
FIG. 10 shows an illustrative front view of the first electronic device of FIG. 1 positioned adjacent the second electronic device of FIG. 5A, according to embodiments.

In another non-limiting embodiment, as shown in FIG. 10, first electronic device 100 may be in electrical communication with second electronic device 200. Back surface 128 (see FIG. 3) of first electronic device 100 may be positioned on and/or may contact front surface 208 of second electronic device 200. When positioned on front surface 208 of second electronic device 200, inductive coils 112 of first electronic device 100 may be aligned with and/or in electrical communication with inductive coil 212b of second electronic device 200. When in electrical communication, the respective inductive coils 112, 212b may transmit power between electronic devices 100, 200.

In order to transmit power between electronic devices 100, 200, the operational modes of the electrically communicative inductive coils 112, 212b may be distinct from one another. In the non-limiting example, as shown in FIG. 10, electronic device 200 may transmit power to electronic device 100. In the non-limiting example, inductive coil 112 of electronic device 100 may be in power receiving mode, and may act as a receiving coil. Additionally, inductive coil 212b of electronic device 200, in electrical communication with inductive coil 112, may be in a power transmitting mode, and may act as a transmitting coil. Once in electrical communication via inductive coils 112, 212b, second electronic device 200 may provide power to first electronic device 100. As a result of providing power from second electronic device 200 to first electronic device 100, a charge of battery 120 of first electronic device 100 (see, FIG. 2) may increase while a charge of the battery of second electronic device 200 (not shown) may decrease. The power provided to first electronic device 100 for charging battery 120 may be provided from the battery of second electronic device 200.

Figure 11:
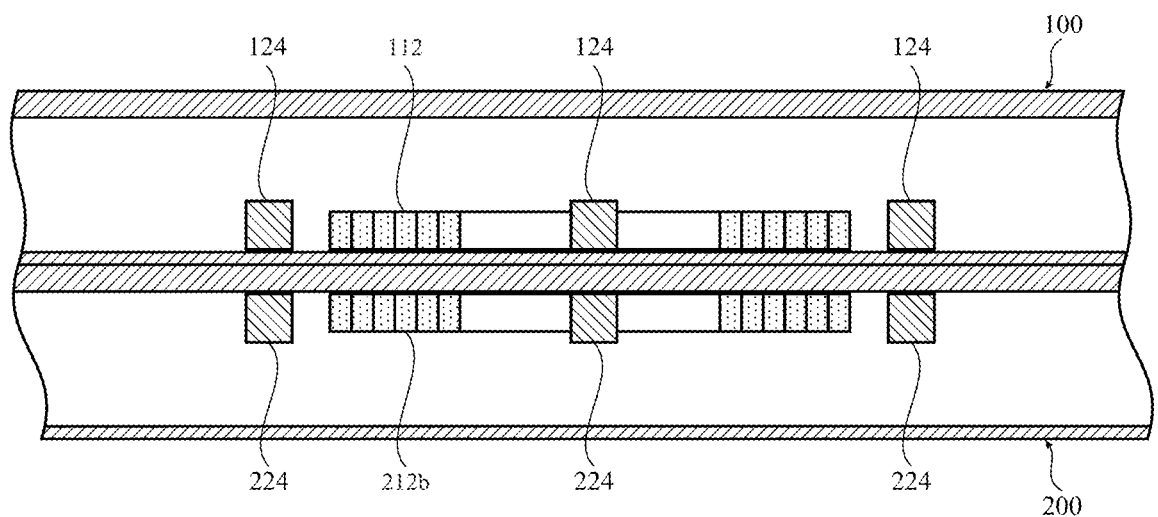
FIG. 11 shows an illustrative side cross-sectional view of a portion of the first electronic device of FIG. 1 and the second electronic device of FIG. 5A taken along line 11-11 of FIG. 10, according to embodiments.

Prior to transmitting power between electronic devices 100, 200, the respective inductive coils 112, 212b may be aligned using alignment magnets 124, 224. As shown in FIG. 11, alignment magnet 124 of first electronic device 100 may be magnetically attracted to and/or may be magnetically coupled to alignment magnets 224 positioned adjacent inductive coil 212b of second electronic device 200. The magnetic coupling of the alignment magnets 124, 224 of respective electronic devices 100, 200 may provide a desired coupling and/or alignment for inductive coils 112, 212b when transmitting power.

Figure 12:
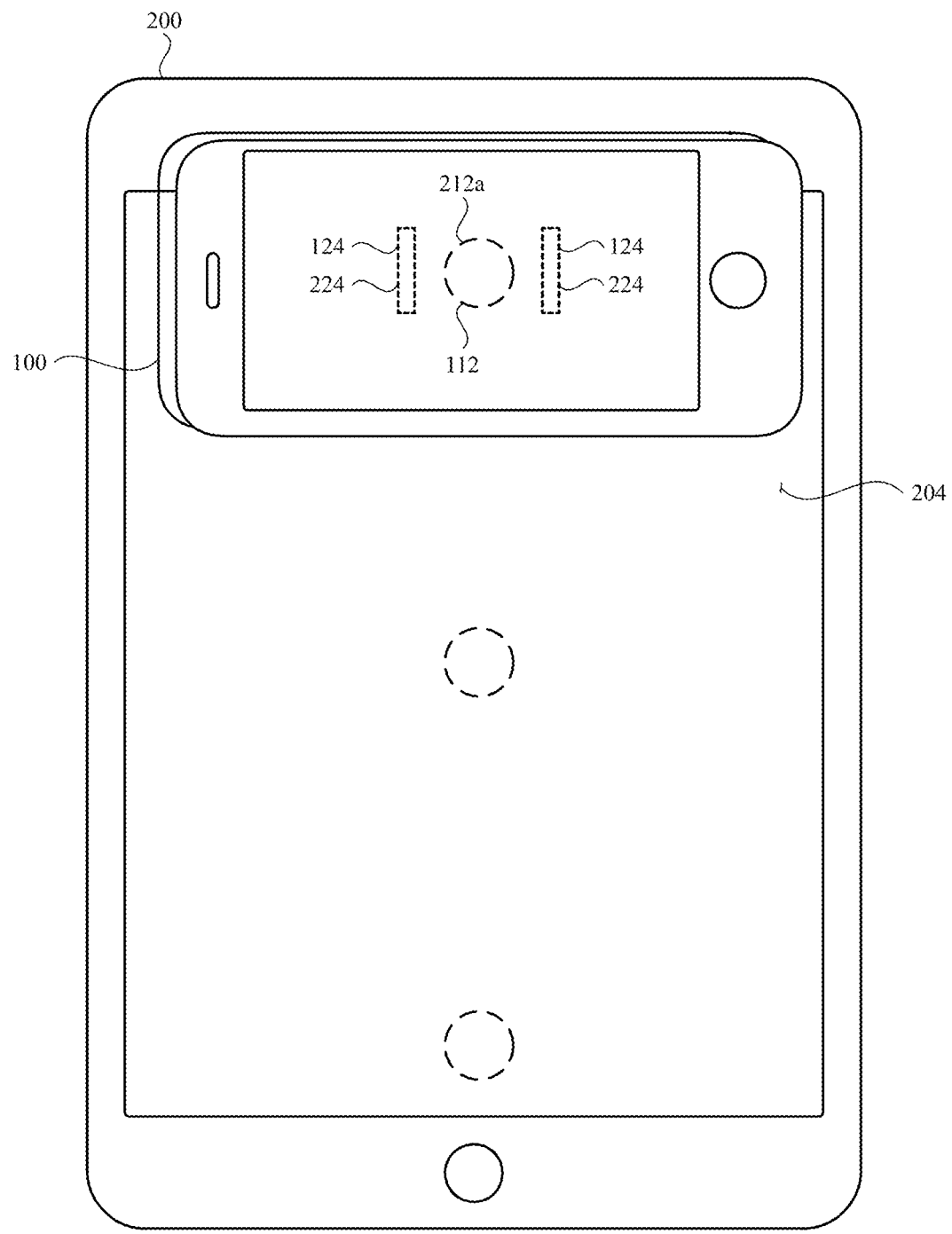
FIG. 12 shows an illustrative front view of the first electronic device of FIG. 1 positioned adjacent the second electronic device of FIG. 5A, according to further embodiments.

FIG. 12 shows another non-limiting example of two electronic devices in electrical communication for transmitting power or data between the electronic devices and/or for inductively charging one electronic device using another electronic device. As shown in FIG. 12, inductive coil 112 of first electronic device 100 may be coupled to inductive coil 212a of second electronic device 200. As a result of being coupled to inductive coil 212a of second electronic device 200 and/or the position of alignment magnets 124, 224 within respective electronic devices 100, 200 (see, FIGS. 1-3, 5A), first electronic device 100 may be oriented sideways with respect to second electronic device 200 when inductive coil 112 is in electrical communication with inductive coil 212a. That is, the position of alignment magnets 124, 224 within respective electronic devices 100, 200 may determine the orientation of first electronic device 100 when positioned on or in contact with second electronic device 200. As discussed herein, by positioning first electronic device 100 on second electronic device 200 such that inductive coil 112 is in electrical communication with 212a, the majority of display 204 of second electronic device 200 may still be visible and/or interacted with by the user.

In the non-limiting example as shown in FIG. 12, first electronic device 100 may transmit power to second electronic device 200. Inductive coil 112 of electronic device 100 may be in a power transmitting mode and may act as a transmitting coil. Additionally, inductive coil 212a of second electronic device 200 in electrical communication with inductive coil 112 may be in a power receiving mode and may act as a receiving coil. Once in electrical communication via inductive coils 112, 212a, first electronic device 100 may provide power to second electronic device 200. As a result of providing power from first electronic device 100 to second electronic device 200, a charge of battery 120 of first electronic device 100 (see, FIG. 2) may decrease while a charge of the battery of second electronic device 200 (not shown) may increase. The power provided to second electronic device 200 for charging the battery of second electronic device 200 may be provided from the battery of first electronic device 100.

Figure 13:
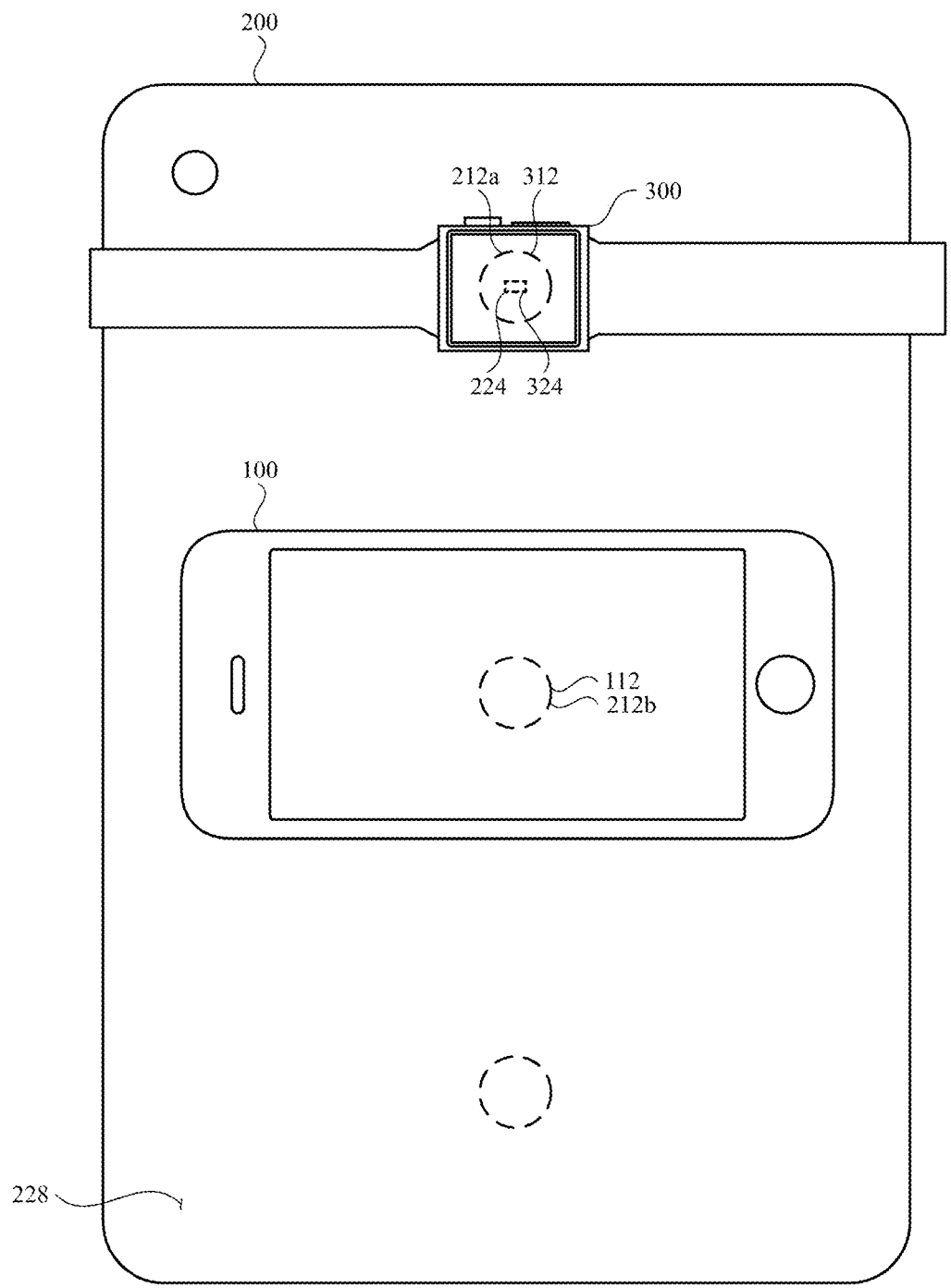
FIG. 13 shows an illustrative front view of the first electronic device of FIG. 1 and the third electronic device of FIG. 6A, positioned adjacent the second electronic device of FIG. 5A, according to embodiments.

FIG. 13 shows another, non-limiting example embodiment. As shown in FIG. 13, multiple electronic devices may be positioned on and/or in contact with second electronic device 200. As shown in FIG. 13, first electronic device 100 and third electronic device 300 may be positioned on or adjacent to second electronic device 200. First electronic device 100 and third electronic device 300 may be positioned on back surface 228 of second electronic device 200. As shown in FIG. 13, first electronic device 100 may be positioned substantially in the center of second electronic device 200, such that inductive coil 112 of first electronic device 100 is in electrical communication with inductive coil 212b of second electronic device 200.

Additionally, as shown in FIG. 13, third electronic device 300 may be positioned on second electronic device 200 such that inductive coil 312 of third electronic device 300 may be in electrical communication with inductive coil 212a of second electronic device 200. As similarly discussed herein, inductive coil 312 of third electronic device 300 may be aligned with inductive coil 212a of second electronic device 200 using alignment magnets 224, 324. However, as a result of third electronic device 300 having only a single alignment magnet 324 positioned within and/or substantially surrounded by inductive coil 312, inductive coils 312, 212a may be aligned only using a single, respective alignment magnet 224, 324 of respective electronic devices 200, 300.

In a non-limiting example, second electronic device 200 may transmit power to both first electronic device 100 and third electronic device 300. As a result, inductive coils 212a, 212b of second electronic device 200 may transmit power and may act as a transmit coil and inductive coils 112, 312 of first and third electronic devices 100, 300, respectively, may receive power and may act as receiving coils.

However, it is understood that the electronic devices 100, 200, 300 shown in FIG. 13 may transmit power in various manners through all different electronic devices. In an additional non-limiting example, first electronic device 100 may transmit power to second electronic device 200 and second electronic device 200 may transmit power to third electronic device 300. In the additional non-limiting example, inductive coils 112, 212a of first and second electronic device 100, 200, respectively, may transmit power and may act as a transmit coils and inductive coils 212b, 312 of second and third electronic devices 200, 300 may receive power and may act as receiving coils.

Figure 14:
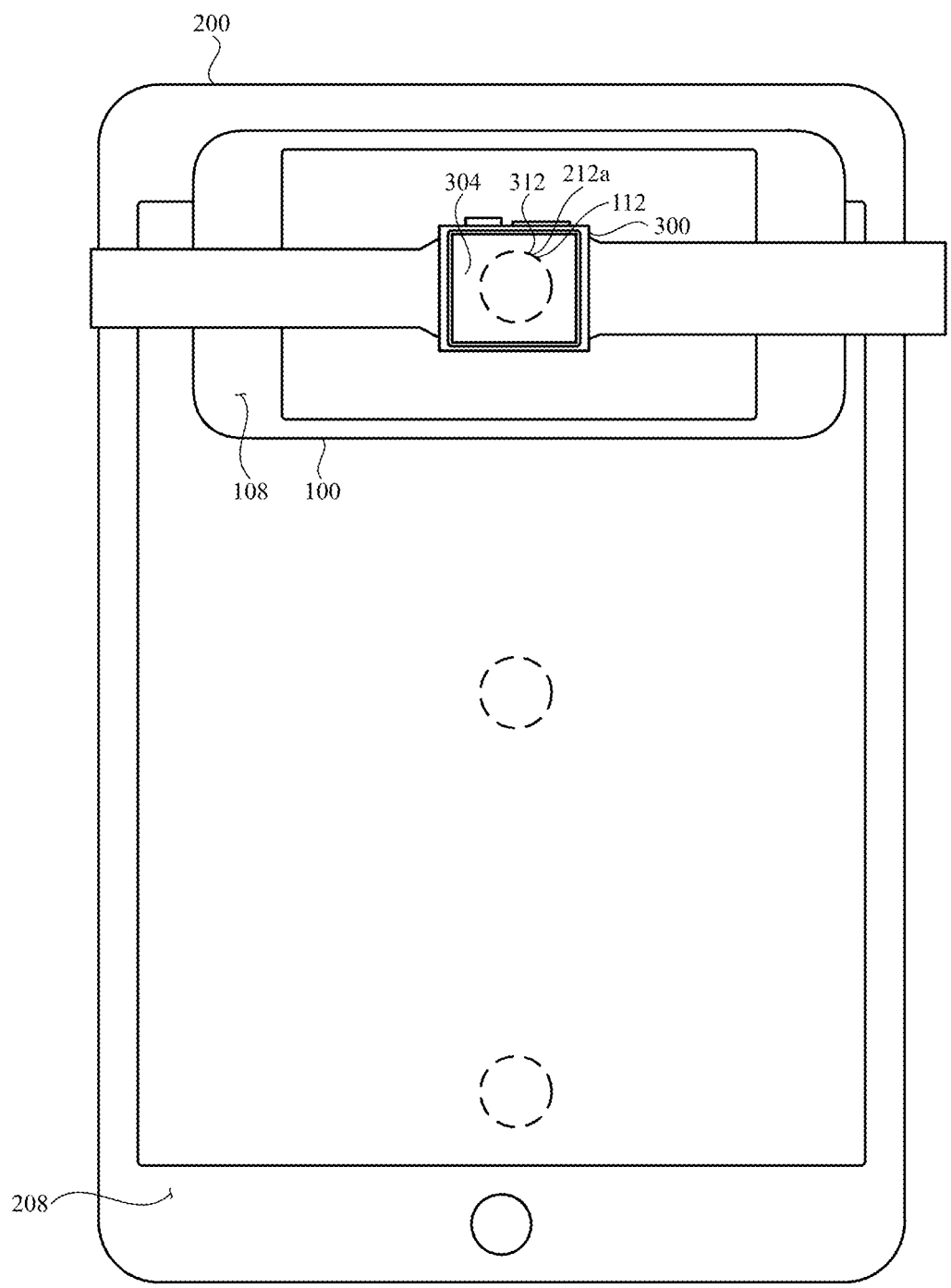
FIG. 14 shows an illustrative front view of the first electronic device of FIG. 1 and the third electronics device of FIG. 6A, positioned adjacent the second electronic device of FIG. 5A, according to embodiments.

FIG. 14 shows a further, non-limiting example of multiple electronic devices configured to inductively charge at least one of the electronic devices. As shown in FIG. 14, third electronic device 300 may contact and/or be positioned on front surface 108 of first electronic device 100. First electronic device 100 may be positioned on and/or may contact front surface 208 of second electronic device 200. In the non-limiting example shown in FIG. 14, inductive coils 112, 212a, 312 may all be aligned and in electrical communication with the adjacent inductive coil or with each of the aligned inductive coils. Inductive coil 312 of third electronic device 300 may be in electrical communication with inductive coil 112 of first electronic device 100. In the example, inductive coil 312 may also be in electrical communication with inductive coil 212a of second electronic device 200. Additionally, in the further, non-limiting example as shown in FIG. 14, inductive coil 112 of first electronic device 100 may be in electrical communication with both inductive coil 312 and 212a.

As a result of the electrical communication formed between first, second, and third electronic devices 100, 200, 300, power may be transmitted through the electronic devices in any manner. For example, second electronic device 200 may transmit power to increase the charge of battery 120 (see FIG. 2) of first electronic device 100 and simultaneously increase the charge of the battery (not shown) of third electronic device 300. In the example, first electronic device 100 may not only receive power, but may also transmit and/or leak a portion of the received power to third electronic device 300. As such, inductive coil 212a of second electronic device 200 may transmit power and act as a transmit coil and inductive coil 312 of third electronic device 300 may receive power and act as a receiving coil.

Inductive coil 112 of first electronic device 100 may continuously alternate between a transmit coil for transmitting power to third electronic device 300 and a receive coil for receiving power from second electronic device 200.

Figure 15:
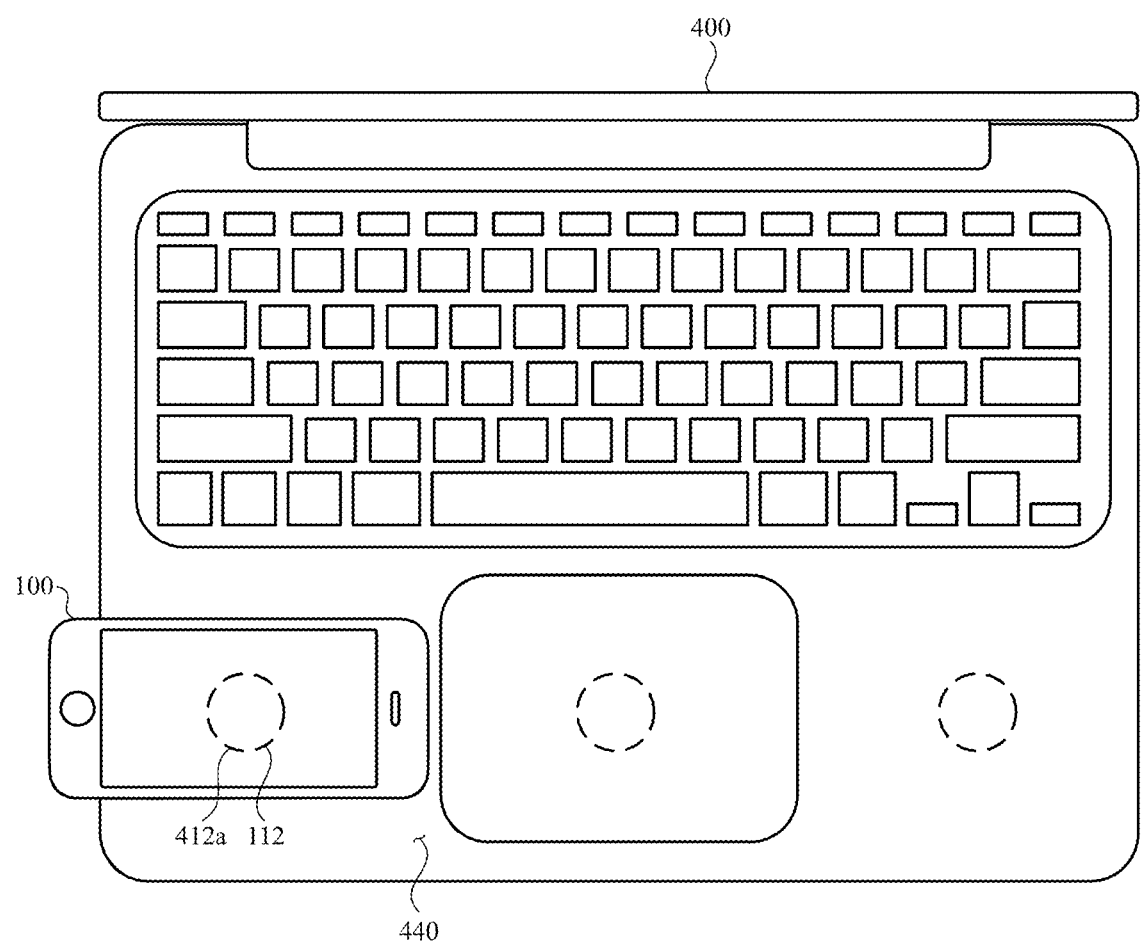
FIG. 15 shows an illustrative front view of the first electronic device of FIG. 1 positioned adjacent the fourth electronic device of FIG. 7A, according to embodiments.

FIGS. 15-20 show a variety of non-limiting examples including fourth electronic device 400 and one or more external electronic devices in electrical communication for transmitting power between the electronic devices and/or for inductively charging one electronic device by another electronic device. As shown in FIG. 15, first electronic device 100 may be positioned on and/or may contact top case 440 of fourth electronic device 400. Inductive coil 112 of first electronic device 100 may be aligned with and in electrical communication with inductive coil 412a positioned within top case 440 of fourth electronic device 400. As discussed herein, inductive coils 112, 412a may be in electrical communication to charge the battery for a respective electronic device 100, 400.

Figure 16:
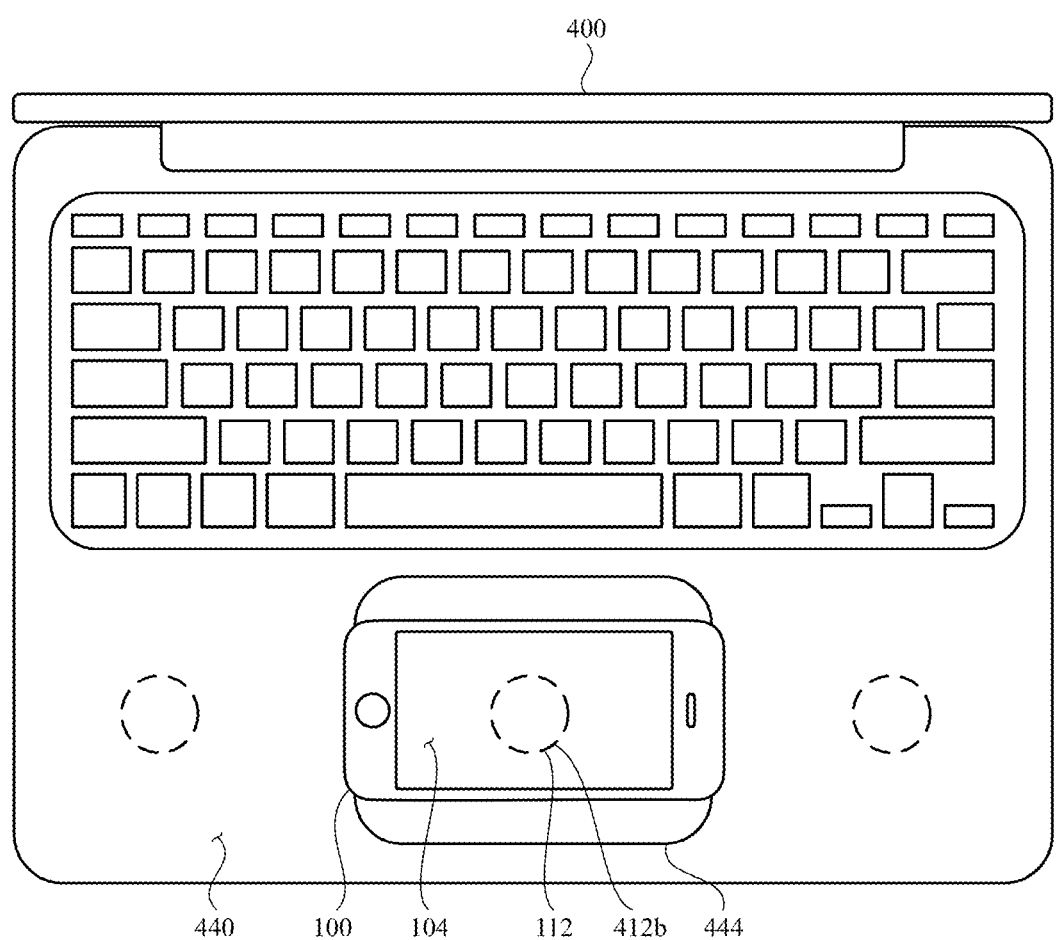
FIG. 16 shows an illustrative front view of the first electronic device of FIG. 1 positioned adjacent the fourth electronic device of FIG. 7A, according to embodiments.

FIG. 16 shows another, non-limiting example, where first electronic device 100 may be positioned on and/or may contact track pad 444 formed in top case 440 of fourth electronic device 400. Inductive coil 112 of first electronic device 100 may be aligned with and in electrical communication with inductive coil 412b positioned below track pad 444 of fourth electronic device 400. As discussed herein, inductive coils 112, 412b may be in electrical communication to charge the battery of respective electronic devices 100, 400. Additionally, in the non-limiting example shown in FIG. 16, as a result of first electronic device 100 substantially covering track pad 444 of fourth electronic device 400, the touchscreen or touch sensor of the display 104 may be used as a substitute input for track pad 444. In some embodiments, first electronic device 100 and fourth electronic device 400 may not only power but may also transmit data such that the touchscreen or touch sensor of the display 104 may receive touch input as a substitute for track pad 444 of fourth electronic device 400 (when inductive coil 112 is in electrical communication with inductive coil 412b). By configuring display 104 of first electronic device 100 to function as track pad 444, first electronic device 100 and fourth electronic device 400 may be in electrical communication to inductively charge the battery of one of the respective devices while also allowing a user to interact with fourth electronic device 400 using track pad 444 functionality via the display 104.

Figure 17:
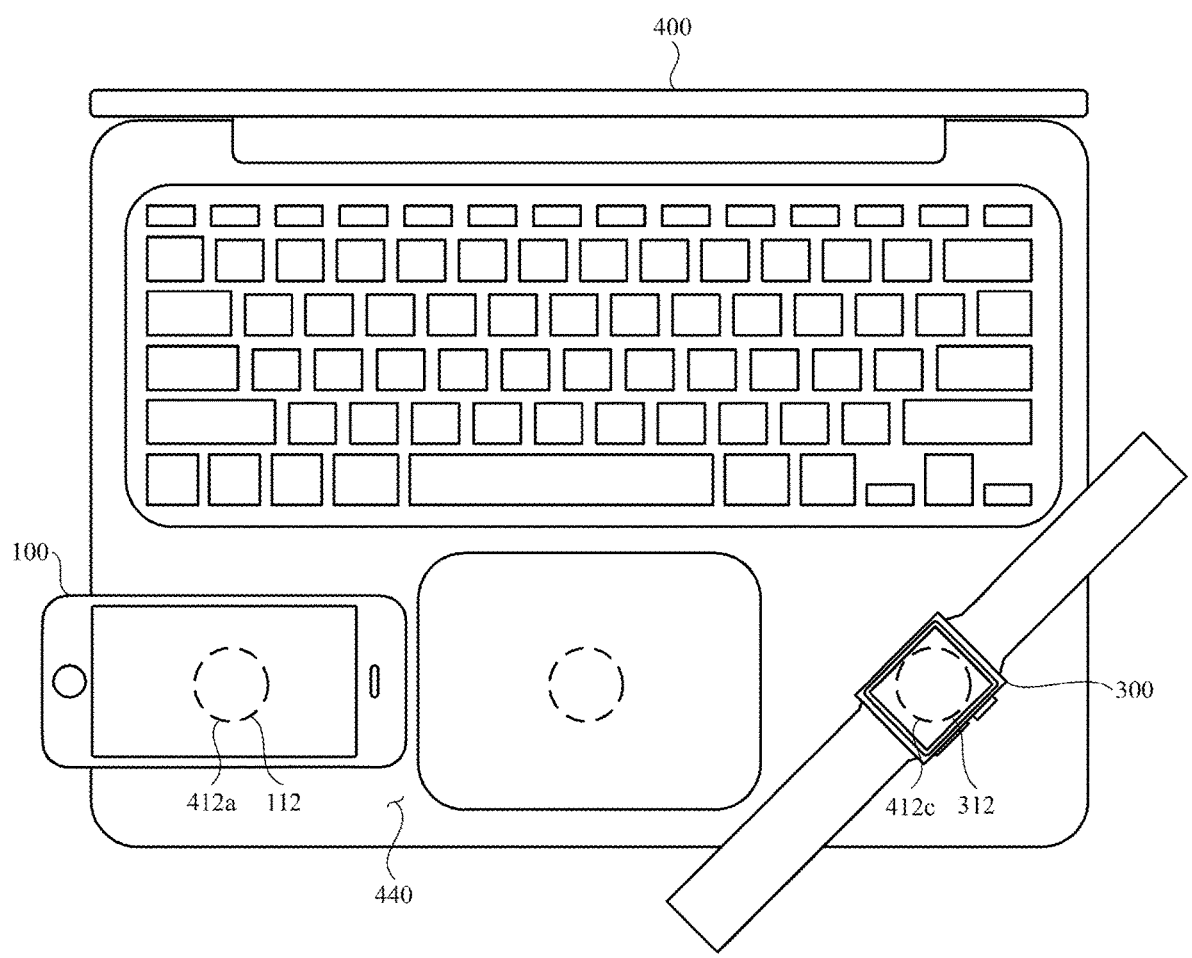
FIG. 17 shows an illustrative front view of the first electronic device of FIG. 1 and the third electronic device of FIG. 6A, positioned adjacent the fourth electronic device of FIG. 7A, according to embodiments.

FIG. 17 shows an additional, non-limiting example of multiple electronic devices. As shown in FIG. 17, first electronic device 100 may be positioned on and/or may contact top case 440 of fourth electronic device 400. Inductive coil 112 of first electronic device 100 may be aligned with and in electrical communication with inductive coil 412a positioned within top case 440 of fourth electronic device 400. Additionally, third electronic device 300 may be positioned on and contact top case 440, opposite first electronic device 100. As shown in FIG. 17, inductive coil 312 of third electronic device 300 may be aligned with and in electrical communication within inductive coil 412c positioned within top case 440 of fourth electronic device 400. As discussed herein, inductive coils 112, 312, 412a, 412c may be in electrical communication to charge the battery for respective electronic devices 100, 300, 400.

Figure 18:
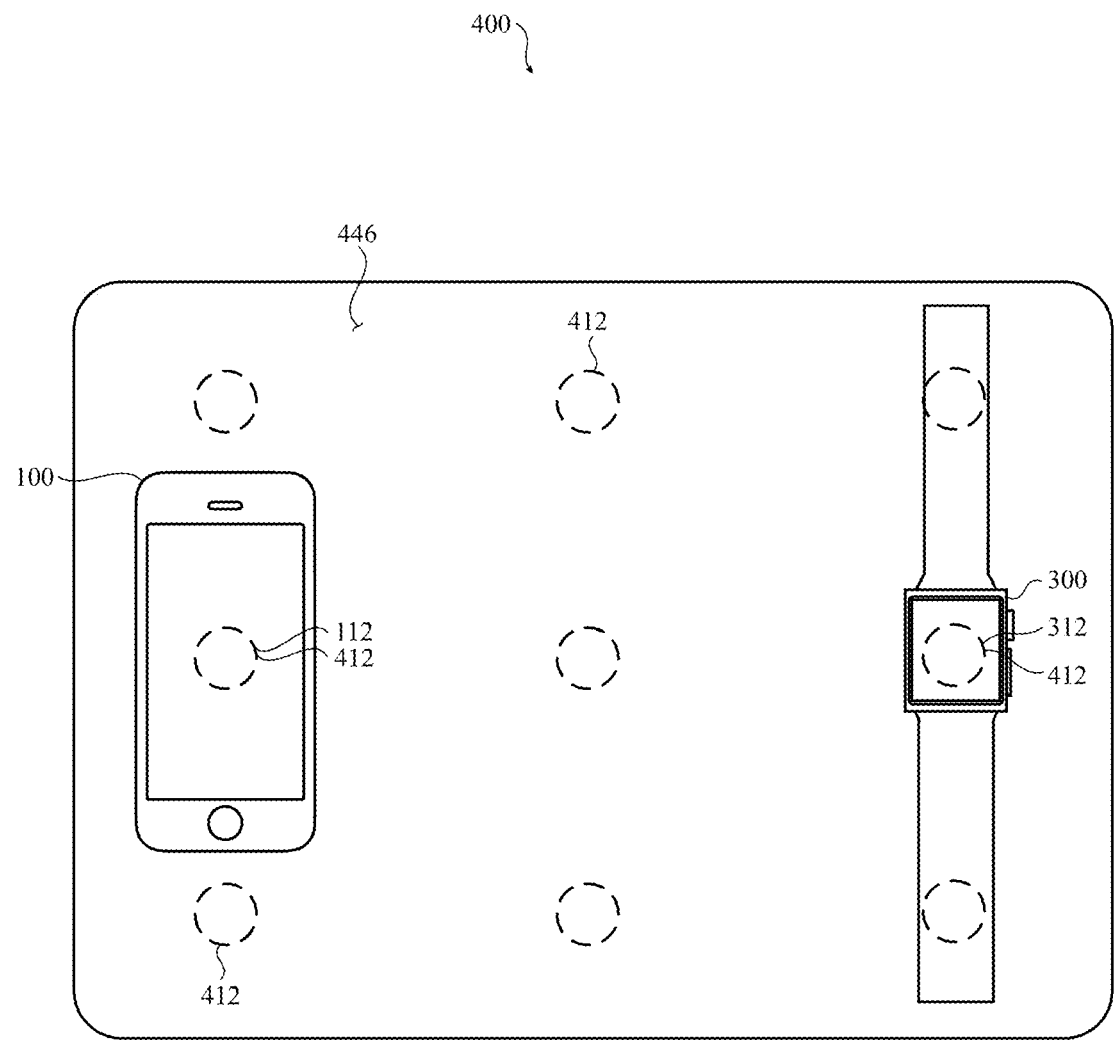
FIG. 18 shows an illustrative front view of the first electronic device of FIG. 1 and the third electronic device of FIG. 6A, positioned adjacent the fourth electronic device of FIG. 7B, according to embodiments.

FIG. 18 shows multiple electronic devices 100, 300 positioned on and/or contacting display case 446 of fourth electronic device 400. The electronic devices 100, 300 may be spaced apart and positioned on display case 446 of fourth electronic device 400. As shown in FIG. 18, inductive coil 112 of first electronic device 100 may be in electrical communication with an inductive coil 412 positioned within display case 446. Additionally, inductive coil 312 of third electronic device 300 may be in electrical communication with an external, inductive coil 412 positioned within display case 446 of fourth electronic device 400.

Figure 19:
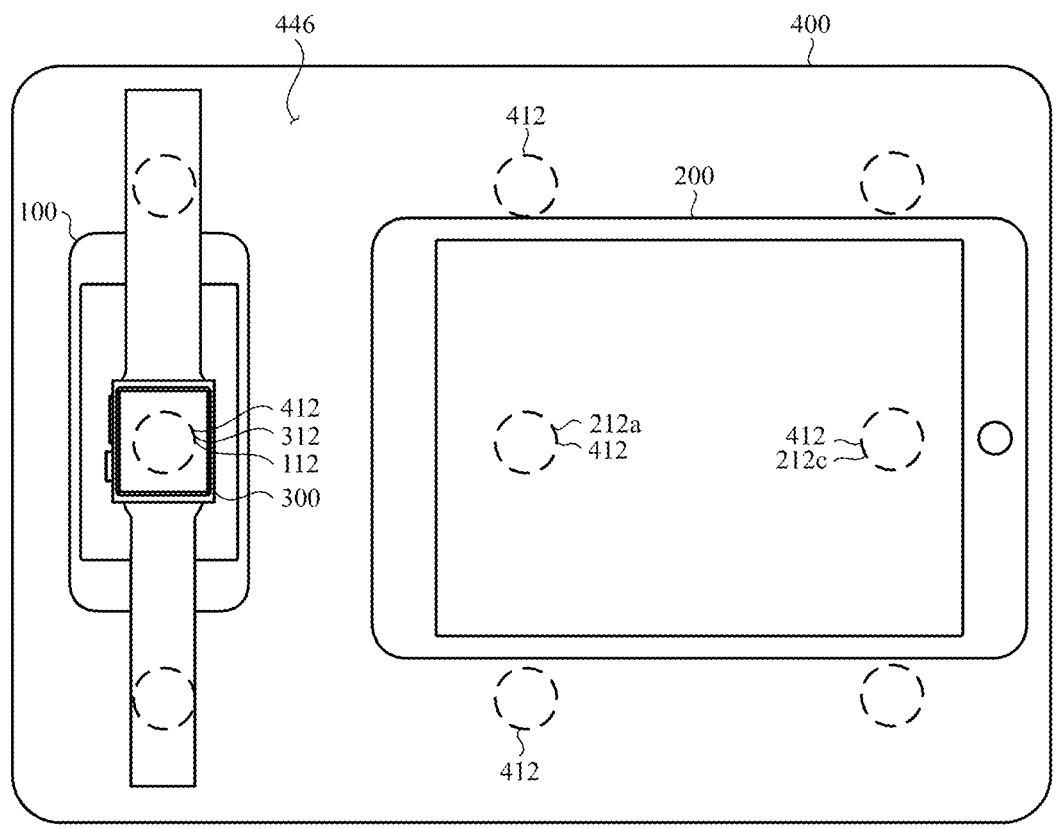
FIG. 19 shows an illustrative front view of the first electronic device of FIG. 1 the second electronic device of FIG. 5A, and the third electronic device of FIG. 6A, positioned adjacent the fourth electronic device of FIG. 7B, according to embodiments.
Figure 20:
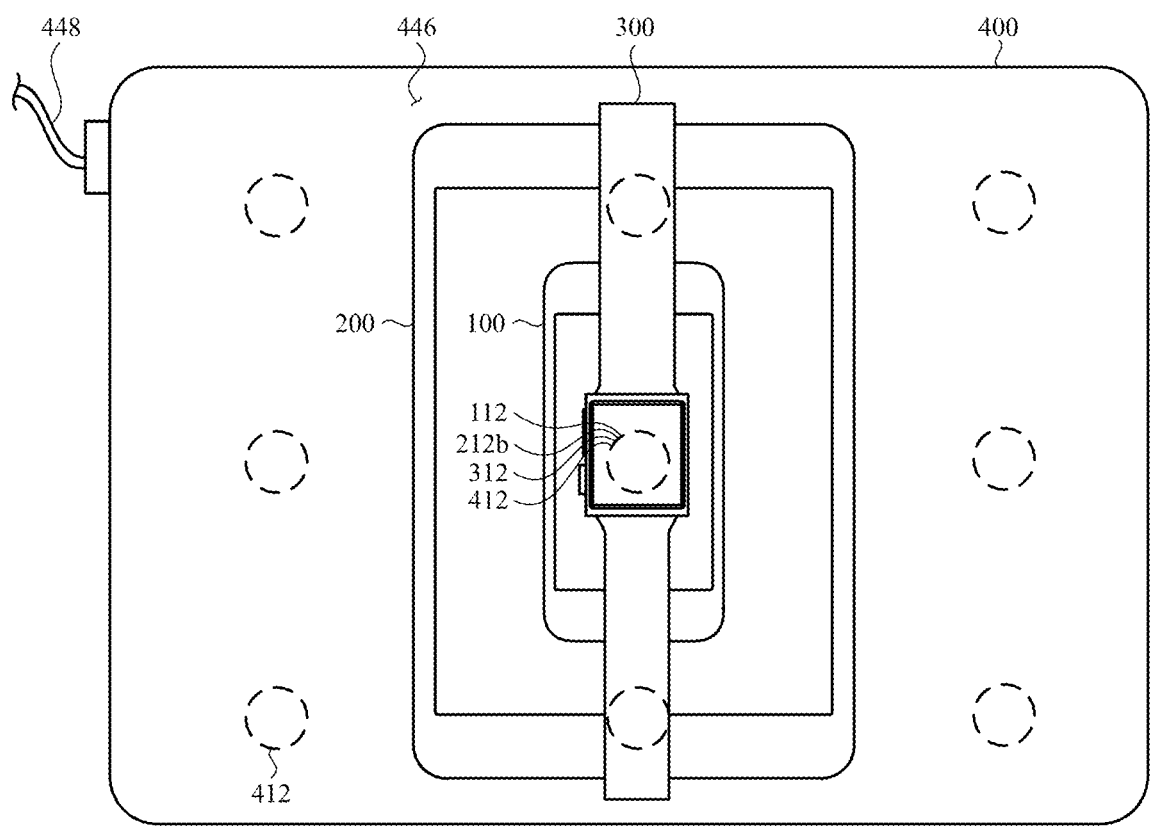
FIG. 20 shows an illustrative front view of the first electronic device of FIG. 1, the second electronic device of FIG. 5A, and the third electronic device of FIG. 6A positioned adjacent the fourth electronic device of FIG. 7B, according to embodiments.

FIGS. 19 and 20 show other non-limiting example embodiments of a multiple electronic devices 100, 200, 300 positioned on and/or contacting display case 446 of fourth electronic device 400. As shown in FIG. 19, first electronic device 100 may be positioned on and/or may contact fourth electronic device 400, and third electronic device 300 may be positioned on and/or may contact first electronic device 100. As similarly discussed herein, inductive coils 112, 312, 412 may be aligned and in electrical communication for transmitting power through at least one of electronic devices 100, 300, 400. Additionally, as shown in FIG. 19, second electronic device 200 may be positioned on and/or may contact display case 446 of fourth electronic device 400 adjacent first electronic device 100 and/or third electronic device 300. Either inductive coil 212a or 212c of second electronic device 200 may be aligned with and in electrical communication with an external inductive coil 412 positioned within display case 446 of fourth electronic device 400.

FIG. 20 shows the electronic devices 100, 200, 300, 400 stacked on top of one another. As such, inductive coil 312 of third electronic device 300, inductive coil 112 of first electronic device 100, inductive coil 212b of second electronic device 200, and inductive coil 412 positioned in display case 446 of fourth electronic device 400 may be substantially aligned and in electrical communication with an adjacent inductive coil and/or all aligned inductive coils. As similarly discussed herein, each of the inductive coils 112, 212b, 312, and 412 may be configured to transmit and/or receive power from an external electronic device.

Also shown in FIG. 20, fourth electronic device 400 may be electrically connected to a power cord 448 for charging fourth electronic device 400. Power cord 448 may be electrically connected to fourth electronic device 400 for increasing the charge of the battery (not shown) of fourth electronic device 400. In the non-limiting example as shown in FIG. 20, power cord 448 may increase the charge of the battery of fourth electronic device 400 while fourth electronic device 400 charges the battery of at least one of the first, second, and third electronic devices 100, 200, 300. So long as fourth electronic device 400 is receiving more power from power cord 448 than it is transmitting to the one or more external electronic devices 100, 200, 300, fourth electronic device 400 may increase the charge of its battery while simultaneously increasing the charge in the battery or batteries in first, second and/or third electronic devices 100, 200, 300.

Figure 21:
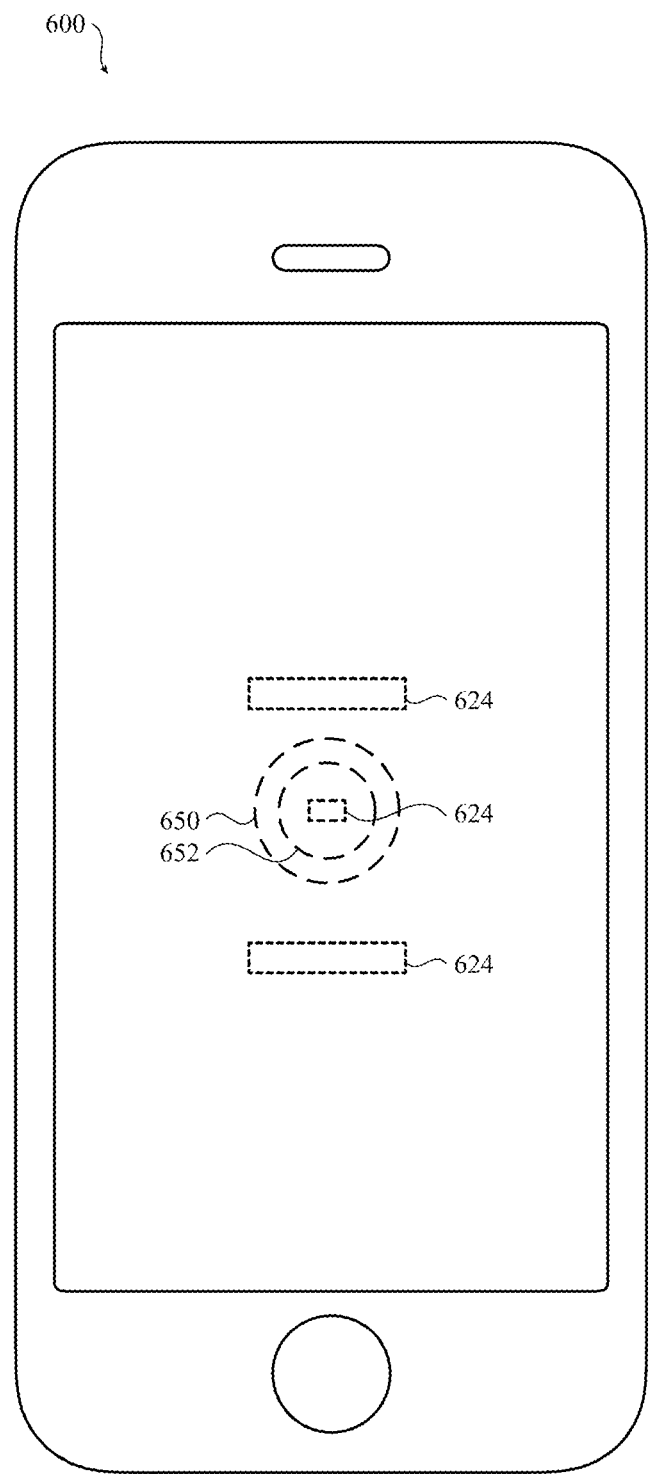
FIG. 21 shows an illustrative front view of a sixth electronic device including a first inductive coil and a second inductive coil, according to embodiments.

FIG. 21 shows a front view of a sixth electronic device 600. In a non-limiting example embodiment as shown in FIG. 21, sixth electronic device 600 may be formed as a smart phone substantially similar to first electronic device 100 discussed herein. As shown in FIG. 21, sixth electronic device 600 includes a pair of (concentric) inductive coils 650, 652, which are described in more detail below with respect to FIGS. 22A-B. Sixth electronic device 600 may also include one or more alignment magnets 624. It is understood that similarly numbered and/or named components may function in a substantially similar fashion. Redundant explanation of these components has been omitted for clarity.

In some embodiments, sixth electronic device 600 may include a first inductive coil 650 and a second inductive coil 652. First inductive coil 650 and second inductive coil 652 may be positioned concentric to one another. In some embodiments, the first (outer) inductive coil 650 may substantially encompass and/or be positioned concentrically around the second (inner) inductive coil 652. First inductive coil 650 may be spaced apart a distance from second inductive coil 652 to minimize and/or eliminate electrical interference and/or noise when one or both of first and second inductive coils 650, 652 are transmitting power. First inductive coil 650 and second inductive coil 652 may be formed from substantially similar materials, as discussed with respect to inductive coil 112 of FIG. 2.

Figure 22A:
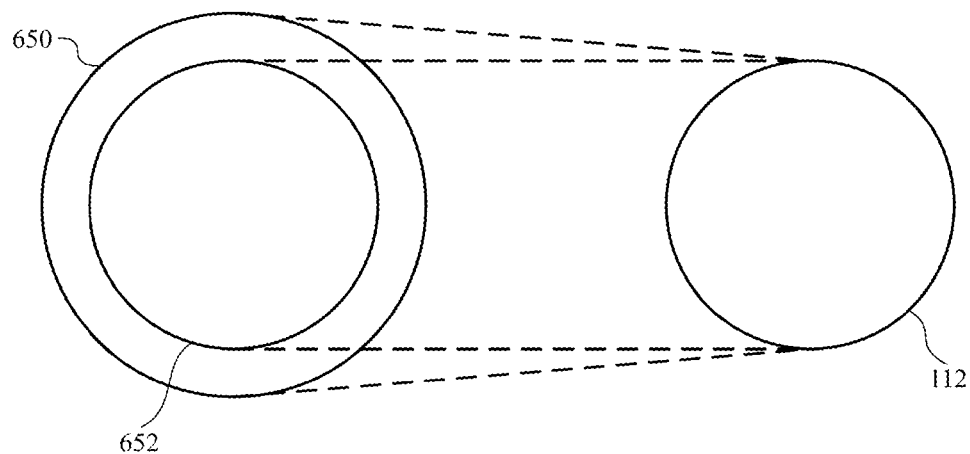
FIGS. 22A and 22B show illustrative schematic views of the first inductive coil and the second inductive coil of the sixth electronic device of FIG. 21 in electrical communication with external inductive coils, according to embodiments.
Figure 22B:
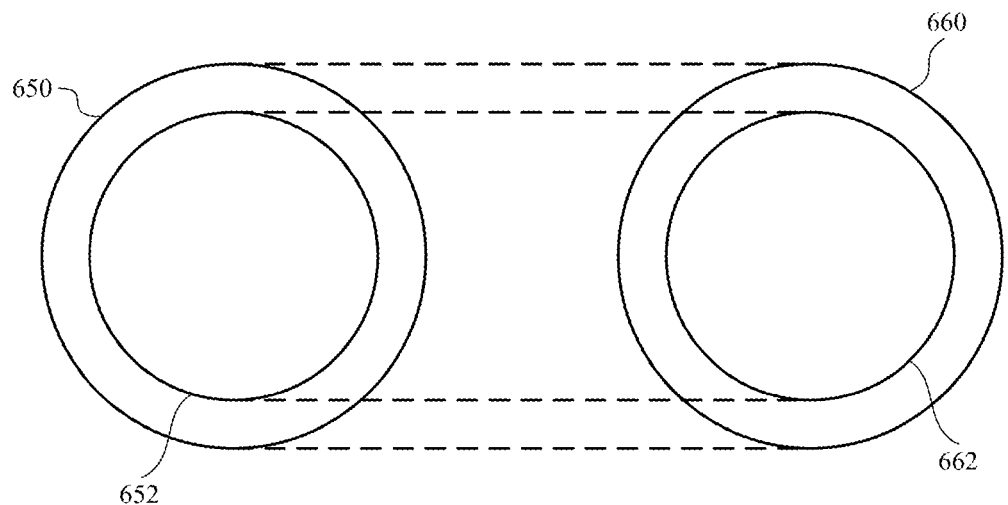

FIGS. 22A and 22B depict a simplified schematic diagram of a first (inner) inductive coil 650 and a second (outer) inductive coil 652 electrically communicating with one or more external inductive coils. In some cases, one or more outer inductive coils 652 may be activated to optimize or improve the wireless power transfer efficiency between the sets of coils. As shown in FIG. 22A, first inductive coil 650 and second inductive coil 652 may be in electrical communication or wirelessly coupled with a single, external inductive coil such as inductive coil 112 of first electronic device 100 (see, FIGS. 1-3). The reference lines in FIG. 22A represent how first inductive coil 650 may be aligned with the inductive coil 112 when first inductive coil 650 is in electrical communication with inductive coil 112. Additionally, the reference lines represent how second inductive coil 652 may be aligned with and may be substantially the same size as inductive coil 112.

In some embodiments, coupling efficiency between pairs of inductive coils may be optimal or maximized when the size of the receiving coil is less than or equal to the size of the transmitting coil. Thus, the configuration depicted in FIG. 22A may correspond to a scenario in which the first inductive coil 650 and second inductive coil 652 together function as an inductive receiver and the inductive coil 112 functions as an inductive inductive. In some implementations, the second (outer) inductive coil 652 may be selectively operated depending on the predicted or measured coupling efficiency with an external coil, such as the inductive coil 112 depicted in FIG. 22A. Conversely, the configuration depicted in FIG. 22A may also correspond to a scenario in which the first inductive coil 650 and second inductive coil 652 together function as an inductive inductive and the inductive coil 112 functions as an inductive receiver. In some implementations, the second (outer) inductive coil 652 may be selectively operated depending on the predicted or measured coupling efficiency with the inductive coil 112.

In general, the first inductive coil 650 and second inductive coil 652 may function substantially similar to the inductive coils discussed herein. In a non-limiting example, first inductive coil 650 and second inductive coil 652 may act as both a transmitting coil in a power transmitting mode and a receiving coil in a power receiving mode. First inductive coil 650 and second inductive coil 652 may both be activated in a transmit operation mode for transmitting power to inductive coil 112. In some cases, first inductive coil 650 and second inductive coil 652 may operate independently or separately. In the non-limiting example where first inductive coil 650 and second inductive coil 652 operate independently, controller (not shown) of electronic device 600 may determine or estimate a coupling efficiency between the inductive coils between the devices. For example, the controller may estimate the coupling efficiency by comparing the estimated amount of power being transmitted/emitted by one device with the actual or estimated amount of power being received by the other device. In some cases, the controller may be used to activate or deactivate the second (outer) inductive coil 652 based on the estimated coupling efficiency.

In some cases, the transmitting device includes multiple outer coils that surround the first coil. Each outer coil may be independently activated based on an estimated coupling efficiency. This allows a single transmit coil to efficiently wirelessly couple power with a wide range of receive coils that may vary in size. The estimated coupling efficiency may be based on an estimate of the transmitted and received power. The estimated coupling efficiency may also be based on the manufacturing specifications of the devices. For example, if the receiving device is identified, the transmitting device may activate one or more outer coils based on the type or size of receiving coil that is specified to be in the identified device. Additionally or alternatively, the device 600 may be configured to activate one or more outer coils for two or more transmission modes and estimate the power coupling efficiency for each transmission mode. The transmission mode having the highest estimated coupling efficiency may be selected to wirelessly transfer power between the two devices.

With respect to FIG. 22A, each of first inductive coil 650 and second inductive coil 652 may be configured as a transmitting coil or a receiving coil. In the non-limiting example, first inductive coil 650 may only operate as a transmitting coil for transmitting power to inductive coil 112 and second inductive coil 652 may only operate as a receiving coil for receiving power from inductive coil 112, as discussed herein. When sixth electronic device 600 is in a power receiving mode, second inductive coil 652 may be operable and first inductive coil 650 may be disabled. Conversely, when sixth electronic device 600 is in a power transmitting mode, first inductive coil 650 may be operable and second inductive coil 652 may be disabled.

FIG. 22B shows another non-limiting example of first inductive coil 650 and second inductive coil 652 in electrical communication with external first inductive coil 660 and external second inductive coil 662 of an external electronic device (not shown). As shown in FIG. 22B, first inductive coil 650 may be aligned with and may be substantially similar in size to external first inductive coil 660. Additionally first inductive coil 650 may be concentrically positioned around and/or may encircle external second inductive coil 662. Also shown in FIG. 22B, second inductive coil 652 may be concentrically surrounded by and/or encircled by external first inductive coil 660, may be aligned with, and may be substantially similar in size to external second inductive coil 662.

Similar to FIG. 22A, first inductive coil 650, second inductive coil 652, external first inductive coil 660, and external second inductive coil 662 may operate as both a transmitting coil and a receiving coil, or alternatively may function as a dedicated transmit or receive coil. Additionally, first inductive coil 650, second inductive coil 652, external first inductive coil 660 and external second inductive coil 662 may also be activated together when transmitting power between the inductive coils or only one inductive coil of each electronic device may be operational when transmitting power. Furthermore, and similar to FIG. 22A, the controller of each electronic device may determine which inductive coil combination is likely to be most efficient when transmitting power and may activate a specified combination of inductive coils based on the efficiency determination. In one non-limiting example, sixth electronic device 600 may transmit power to the external electronic device (not shown) having external first and second inductive coils 660, 662. The respective controllers in the electronic devices may measure or estimate the efficiency of the coupling and one or both of the controllers may either disable/deactivate or enable/activate one or more of the inductive coils to improve the efficiency of the coupling. In some cases, one or both of the controllers perform an iterative measurement and activation or deactivation of the coils to determine a configuration that provides the maximum efficiency given the hardware configuration of the respective devices and sets of inductive coils.

Figure 23A:
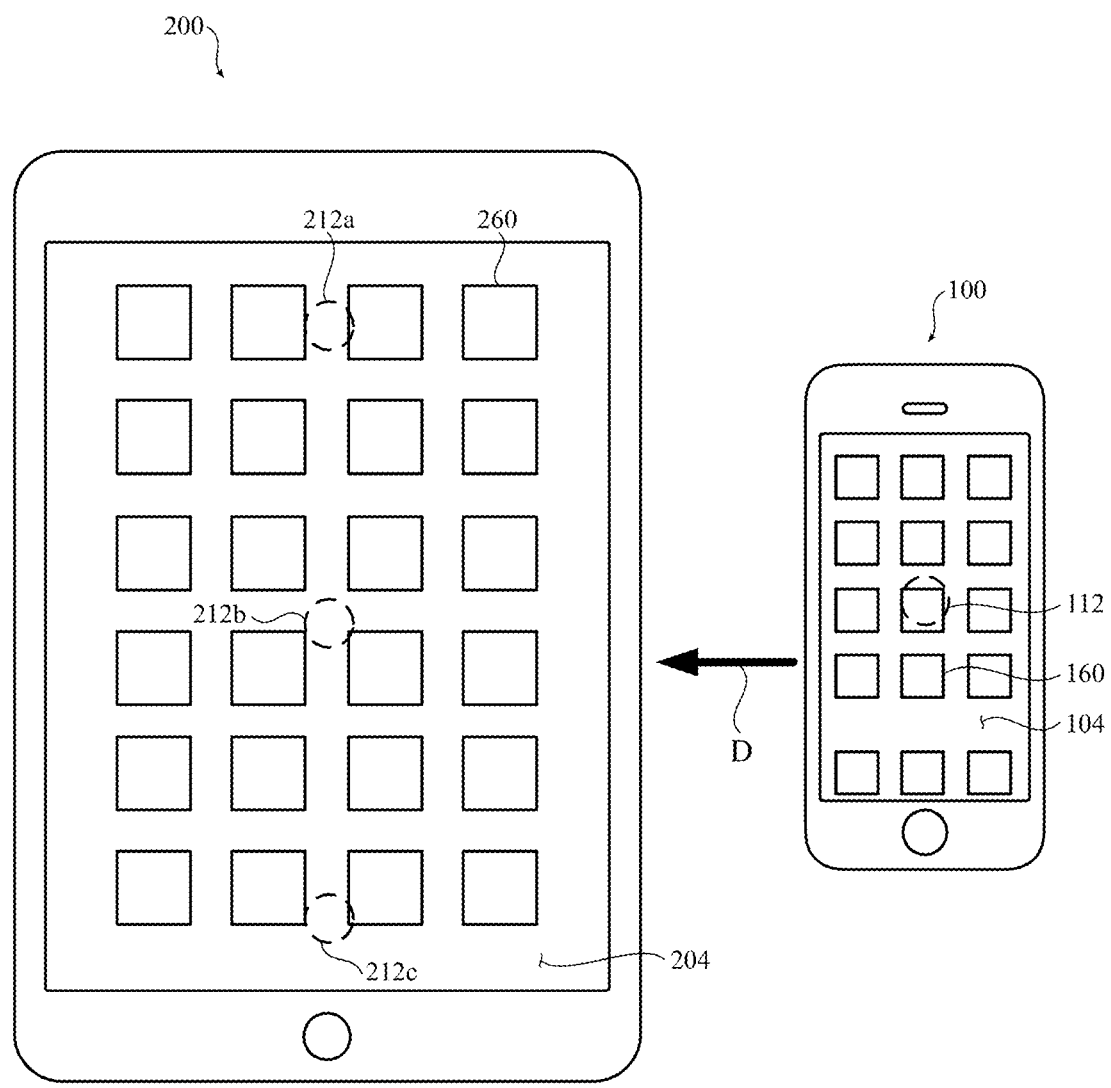
FIGS. 23A-23C show illustrative front views of the first electronic device of FIG. 1 and the second electronic device of FIG. 5A undergoing processes for device-to-device inductive charging, according to embodiments.
Figure 23B:
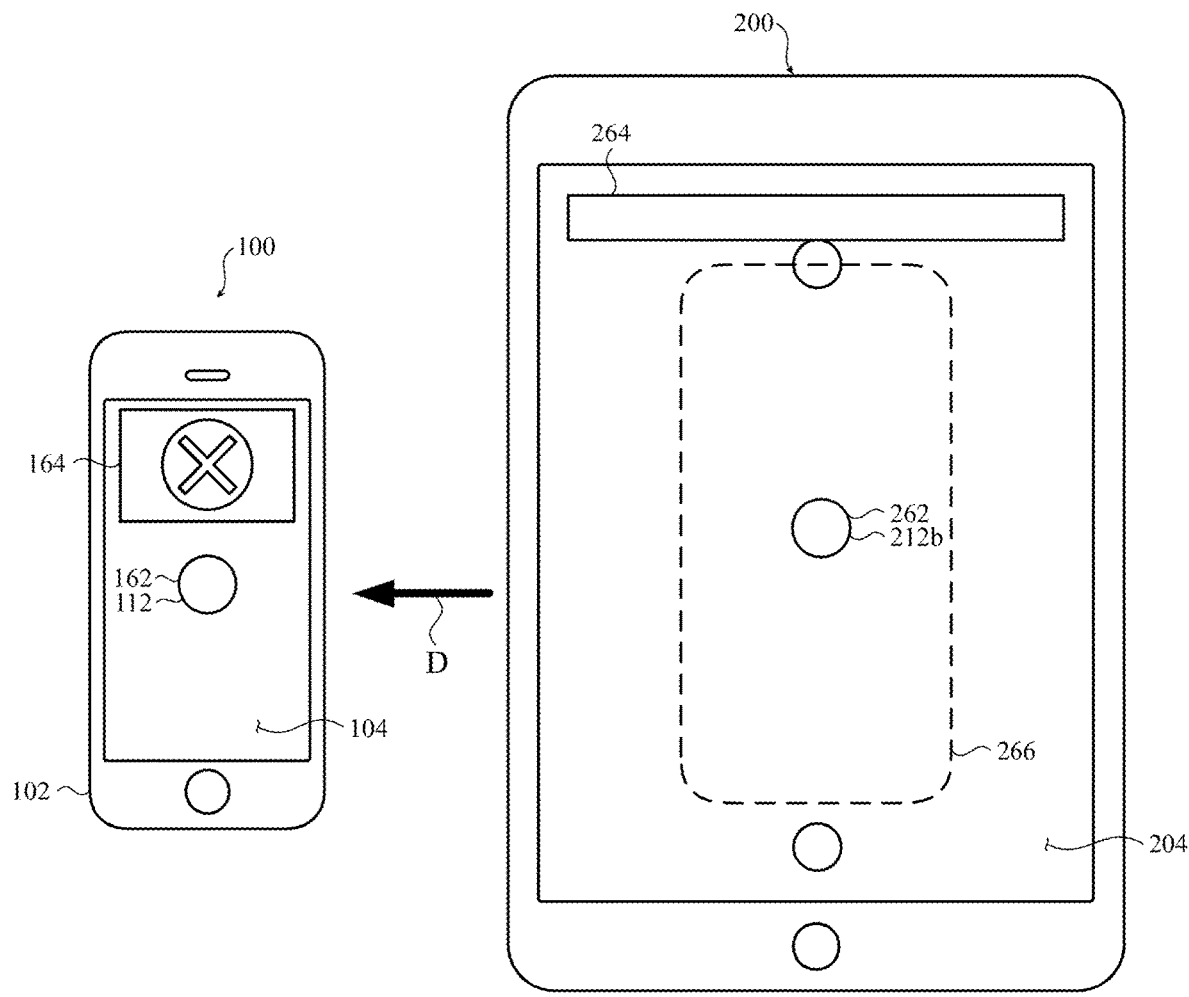
Figure 23C:
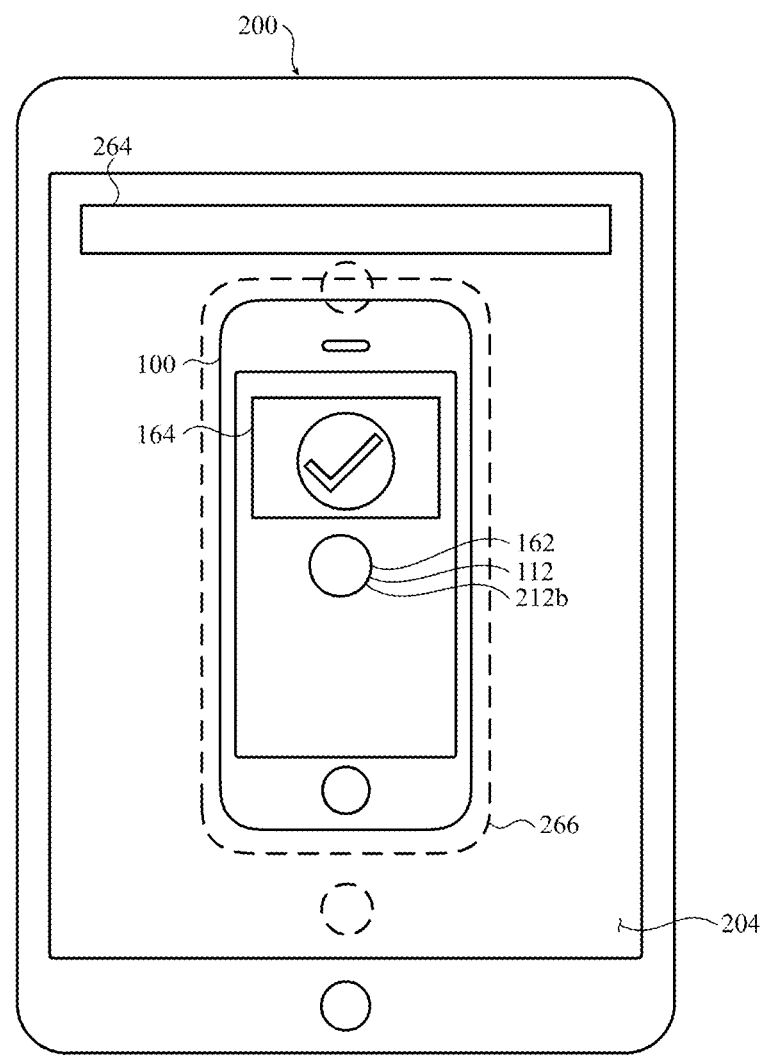

When utilizing the inductive charging systems and processes discussed herein with respect to FIGS. 1-22B display features of the electronic devices may be altered or modified based on the inductive charging system. Turning to FIGS. 23A-23C, a process of aligning first electronic device 100 with second electronic device 200 using display features is shown. As shown in FIG. 23A, first electronic device 100 and second electronic device 200 may be operational. As a result, first electronic device 100 may include a group of interactive, computerized application icons 160, referred to herein as "app icons," visible on display 104. The group of apps icons 160 may be arranged in rows and columns on display 104 of first electronic device 100. As shown in FIG. 23A, second electronic device 200 may also include a group of apps icons 260 visible on display 204. The app icons 160, 260 are provided by way of a non-limiting example only and other graphical objects or elements may be displayed and altered or manipulated in a similar way as described herein.

In some embodiments, inductive coils 112, 212a-c are used to detect the presence or proximity of the two devices 100, 200. In some cases, as first electronic device 100 moves over second electronic device 200 in a direction (D), inductive coil 112 of first electronic device 100 may briefly couple and/or electrically communicate with an inductive coil 212a-c of second electronic device 200. In the non-limiting example, as shown in FIGS. 23A and 23B, when the brief coupling and/or communication is made between an inductive coil 112a-c of first electronic device 100 and an inductive coil 212a-c of second electronic device 200, the presence or proximity of the devices are detected and one or both of electronic devices 100, 200 may enter into an inductive charging mode. In some embodiments, a proximity sensor or other sensing device is used to detect the presence or proximity of electronic devices 100, 200 and may be used to trigger an inductive charging mode in one or both of electronic devices 100, 200.

In some embodiments, the graphical output of one or both of the displays of electronic devices 100, 200 may be altered or modified in response to a coupling between the inductive coils 112, 212a-c. FIG. 23B shows first electronic device 100 and second electronic device 200 aligned in accordance with an inductive charging mode after first electronic device 100 has moved over and coupled and/or communicated with second electronic device 200 via inductive coils 112, 212a-c. As shown in FIG. 23B, the display of electronic devices 100, 200 may be modified such that apps icons 160, 260 (see FIG. 23A) may no longer be displayed or visible on one or both of first and second electronic devices 100, 200. In the non-limiting example shown in FIG. 23B, first electronic device 100 and second electronic device 200 may include device-charging graphical presentation visible on displays 104, 204, respectively, in response to the coupling and/or communication between the inductive coils 112, 212a-c. For example, an inductive coil graphic 162 may be presented on display 104 of first electronic device 100 for indicating the location of the inductive coil 112 within the enclosure 102 of first electronic device 100.

In some embodiments, one or both of the displays 104, 204 may present a graphical output in response to first electronic device 100 being proximate to second electronic device 200. In some instances, the graphical output may include or indicate an alignment condition between electronic devices 100, 200, which may be used to assist or guide the alignment of the two electronic devices 100, 200. For example, as shown in FIG. 23B, the display 104 may also present an indicator box 164 which may provide a visual indicator to a user of the alignment between electronic devices 100, 200. In some instances, the indicator box 164 may include text or a graphic which may relate to the alignment of first electronic device 100 with second electronic device 200 when attempting to align inductive coils 112, 212*b* to facilitate efficient power transmission between electronic devices 100, 200, as discussed herein. In the example embodiment shown in FIG. 23B, the indicator box 164 may present a graphic to a user indicating that first electronic device 100 is not properly aligned with second electronic device 200, and thus, optimal inductive charging may not be achieved between electronic devices 100, 200. In some cases, the indicator box 164 may indicate a degree of misalignment or provide a visual guide to assist the user in moving electronic devices 100, 200 into alignment. The indication may include a direction and/or magnitude of misalignment, which is updated as electronic devices 100, 200 move with respect to each other.

As shown in FIG. 23B, display 204 of second electronic device 200 may include substantially similar display features as display 104 of first electronic device 100. That is, display 204 may display to a user an inductive coil graphic 262 corresponding to a location of the inductive coil 212*b* and an indicator box 264. In addition in the non-limiting example, display 204 of second electronic device 200 may also include a predicted device outline 266 to aid in the positioning of first electronic device 100 on second electronic device 200 for inductive charging between the devices. When inductive coil 112 of first electronic device 100 briefly communicates with inductive coil 212*b* of second electronic device 200, second electronic device 200 may identify or determine that first electronic device 100 is a smart phone. As such, display 204 of second electronic device 200 may display device outline 266 for a smart phone to indicate to the user where first electronic device 100 may be positioned on second electronic device 200 for inductive charging.

As shown in FIG. 23C, a user may position first electronic device 100 on second electronic device 200 within device outline 266, which may result in first and second electronic devices 100, 200 being aligned for inductive charging. In the non-limiting example, when first electronic device 100 is positioned within device outline 266, inductive coil 112 of first electronic device 100 may be aligned and/or in electrical communication with inductive coil 212*b* of second electronic device 200. Additionally, when first electronic device 100 is positioned within or substantially close to device outline 266, the alignment magnets 124, 224 (see FIGS. 2 and 5A) of first and second electronic device 100, 200 may be magnetically attracted to each other, which may assist in positioning the first electronic device 100 such that inductive coil 112 may be aligned and/or in electrical communication with inductive coil 212*b*, as discussed herein. As shown in FIG. 23C, when inductive coil 112 of first electronic device 100 is aligned and/or in electrical communication with inductive coil 212*b*, indicator box 164 of first electronic device 100 and/or indicator box 264 of second electronic device 200 may provide or display a graphic or text to a user, indicating that power transmission between electronic devices 100, 200 is ready to begin or has already begun.

Figure 24:
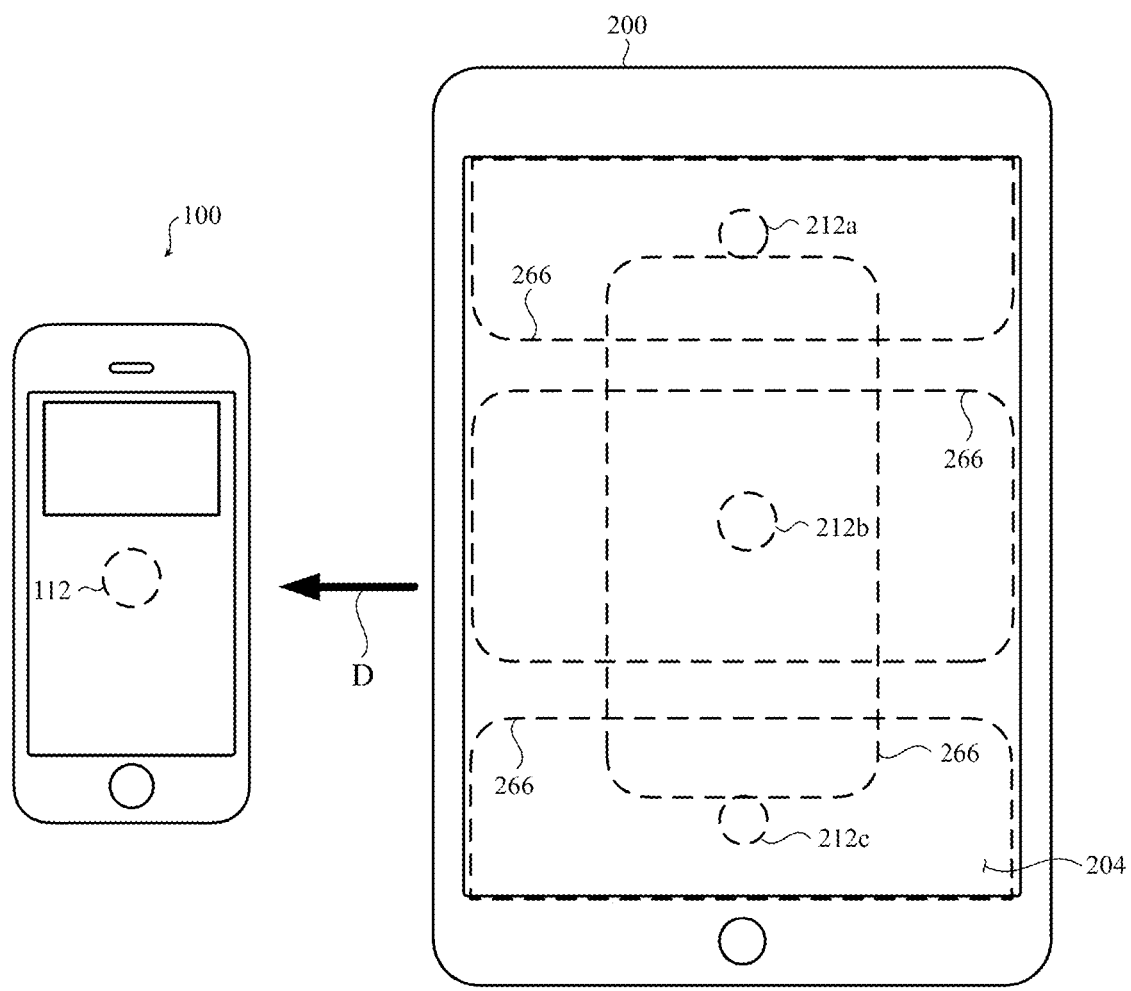
FIG. 24 shows an illustrative front view of the first electronic device of FIG. 1 and the second electronic device of FIG. 5A, undergoing processes for device-to-device inductive charging, according to additional embodiments.

In another non-limiting example shown in FIG. 24, second electronic device 200 may include a group of inductive coils 212*a*, 212*b*, and 212*c*. As a result, when inductive coil 112 of first electronic device 100 briefly couples and/or communicates with inductive coils 212*a*, 212*b*, 212*c* of second electronic device 200, the display 204 may display to a user a group of device outlines 266. Each device outline 266 shown in FIG. 24 may correspond to aligning and/or positioning inductive coil 112 of electronic device 100 with an external inductive coil 212*a*, 212*b*, 212*c* of second electronic device 200. Additionally, the orientation of each device outline 266 visible on display 204 of second electronic device 200 may correspond to the positioning of alignment magnets 224 (see FIG. 5A) of second electronic device 200. These device outlines 266 may aid in aligning and/or configuring first inductive coil 112 in electrical communication with one or more of inductive coils 212*a*, 212*b*, 212*c*, as discussed herein.

Figure 25:
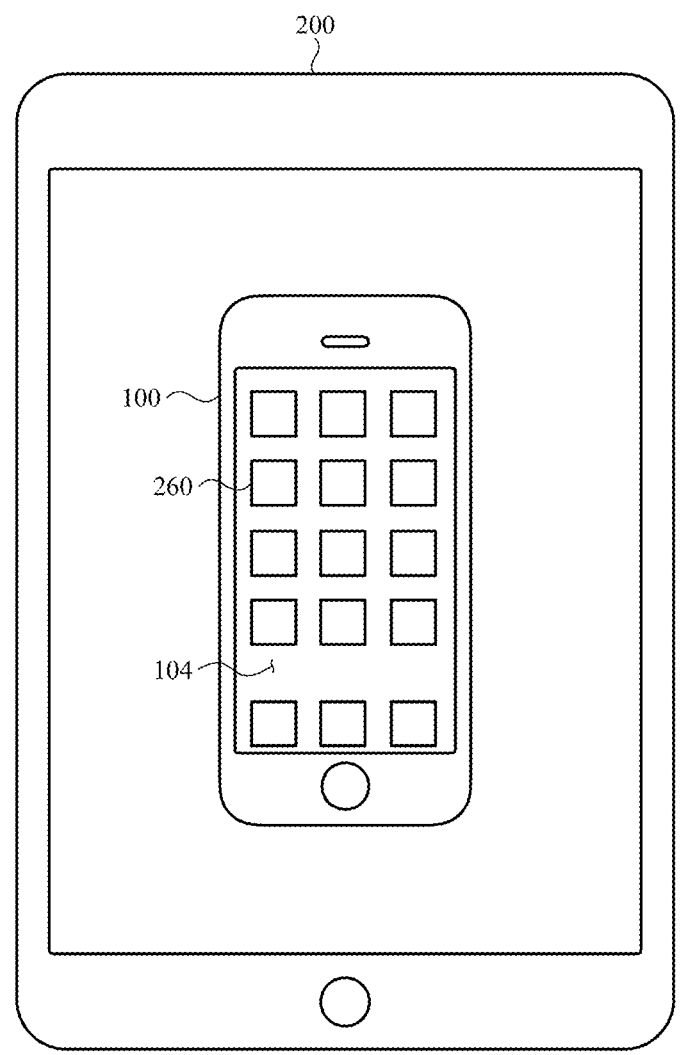
FIG. 25 shows an illustrative front view of the first electronic device of FIG. 1 displaying app icons of the second electronic device of FIG. 5A, according to embodiments.

In addition, when positioning first electronic device 100 on second electronic device 200 to transmit power between the electronic devices, the data and displays of the electronic devices may be transferred. That is, as shown in FIG. 25 and similarly discussed herein with respect to FIG. 23C, first electronic device 100 may be positioned on second electronic device 200, such that inductive coil 112 (see FIG. 2) of first electronic device 100 may be in electrical communication with inductive coil 212*b* (see FIG. 5A) of second electronic device 200. Additionally, as discussed herein, once in electrical communication, second electronic device 200 may transmit power to first electronic device 100 for increasing the charge of battery 120 of first electronic device 100. In addition to transmitting power, inductive coils (112, 212*b*) may transmit data, as well. As shown in FIG. 25, second electronic device 200 may transmit data to first electronic device 100, such that one or more app icons 260 of second electronic device 200 may be visible and/or interacted with on display 104 of first electronic device 100. As a result, as first electronic device 100 increases the charge of battery 120 (FIG. 2) by receiving power from second electronic device 200, first electronic device 100 may also receive data from second electronic device 200, which allows a user to interact with second electronic device 200 using first electronic device 100.

Figure 26A:
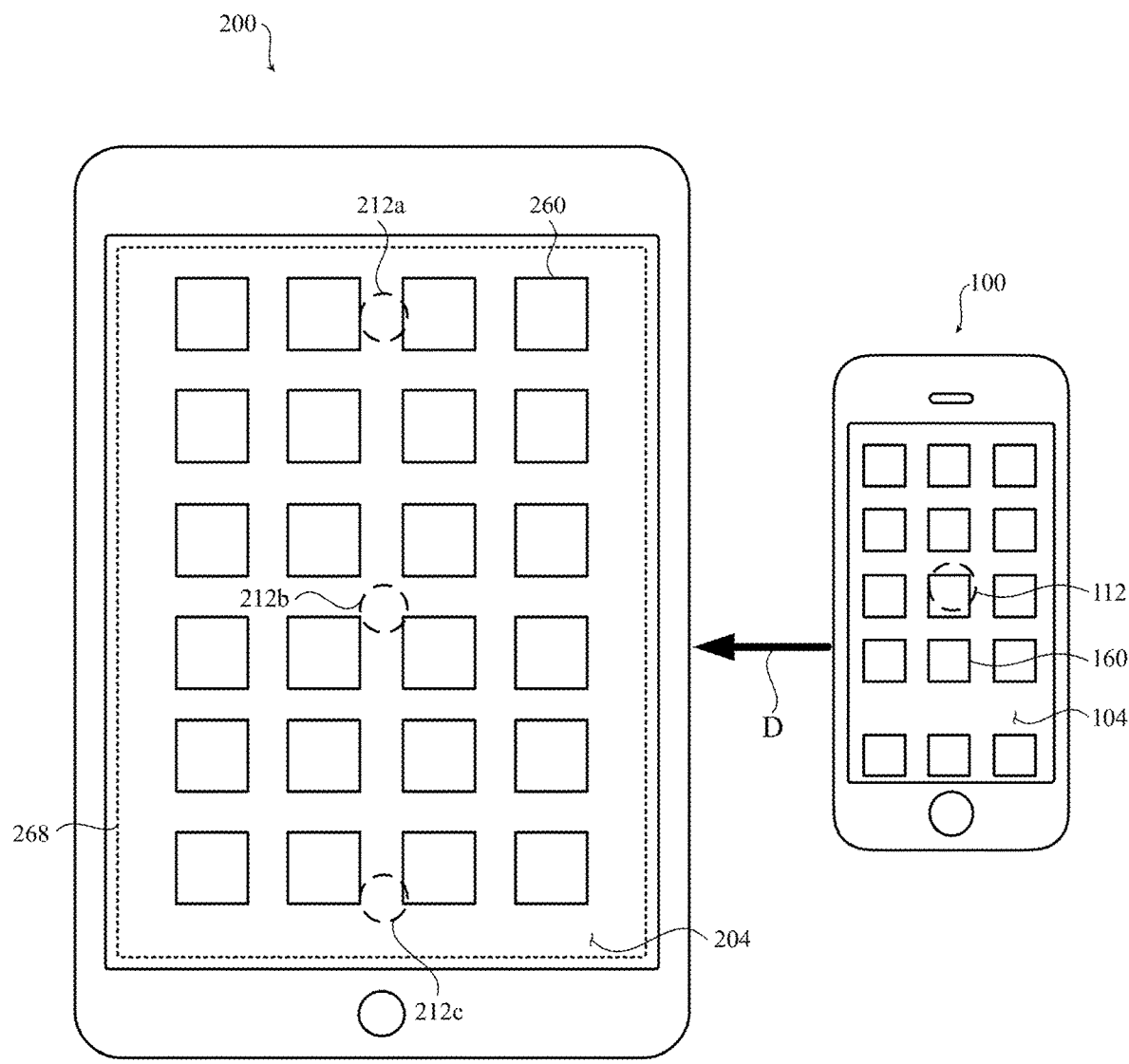
FIGS. 26A-26C show illustrative front views of the first electronic device of FIG. 1 and the second electronic device of FIG. 5A undergoing processes for device-to-device inductive charging, according to further embodiments.
Figure 26B:
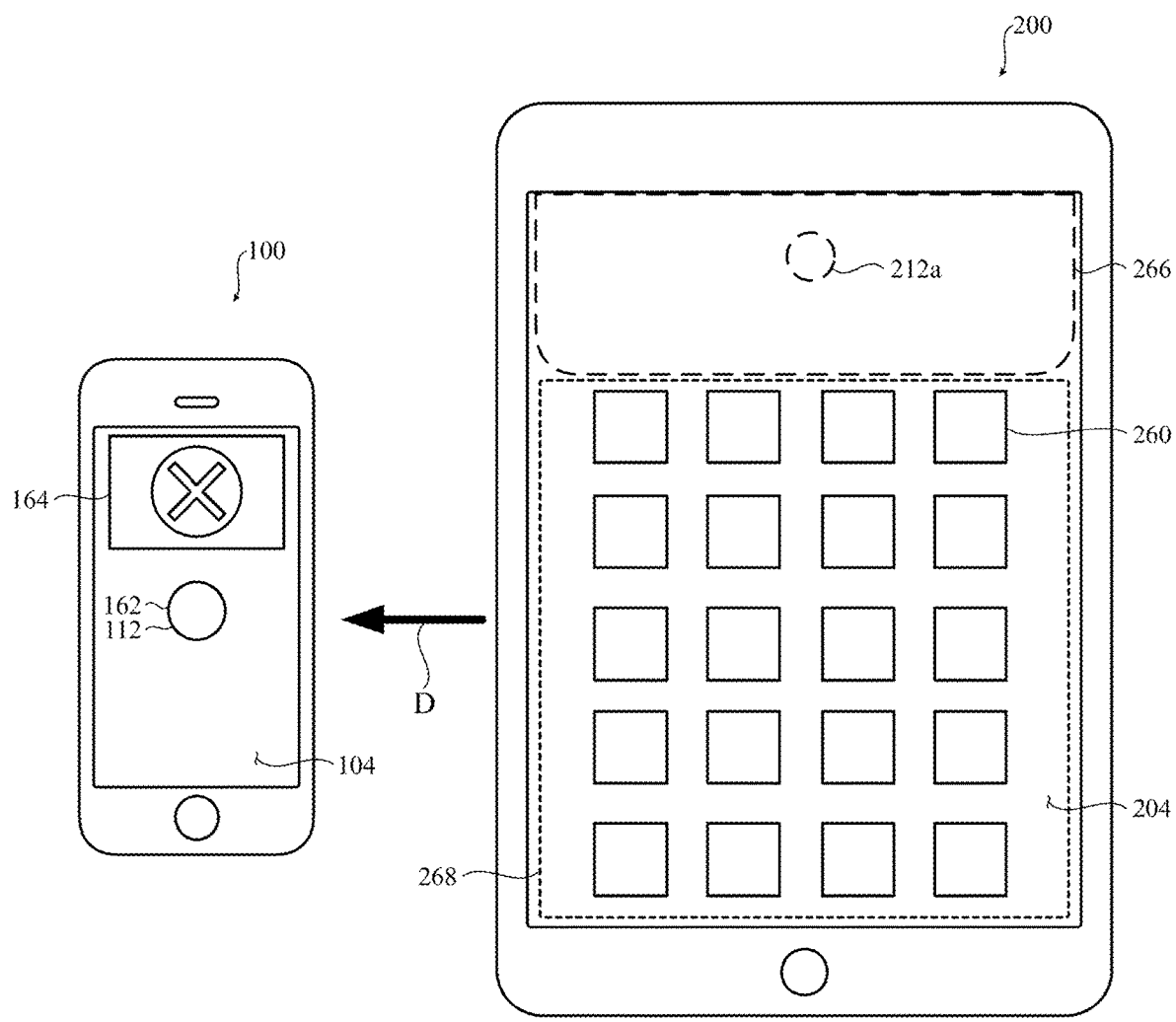
Figure 26C:
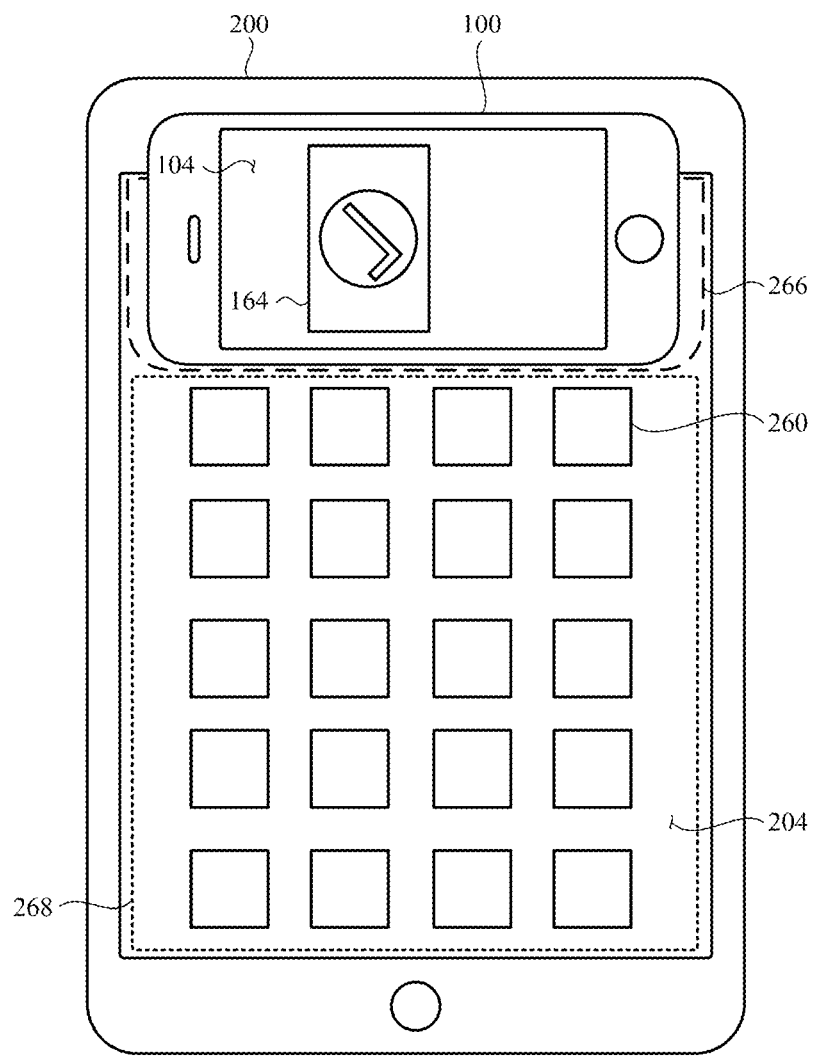
Figure 27:
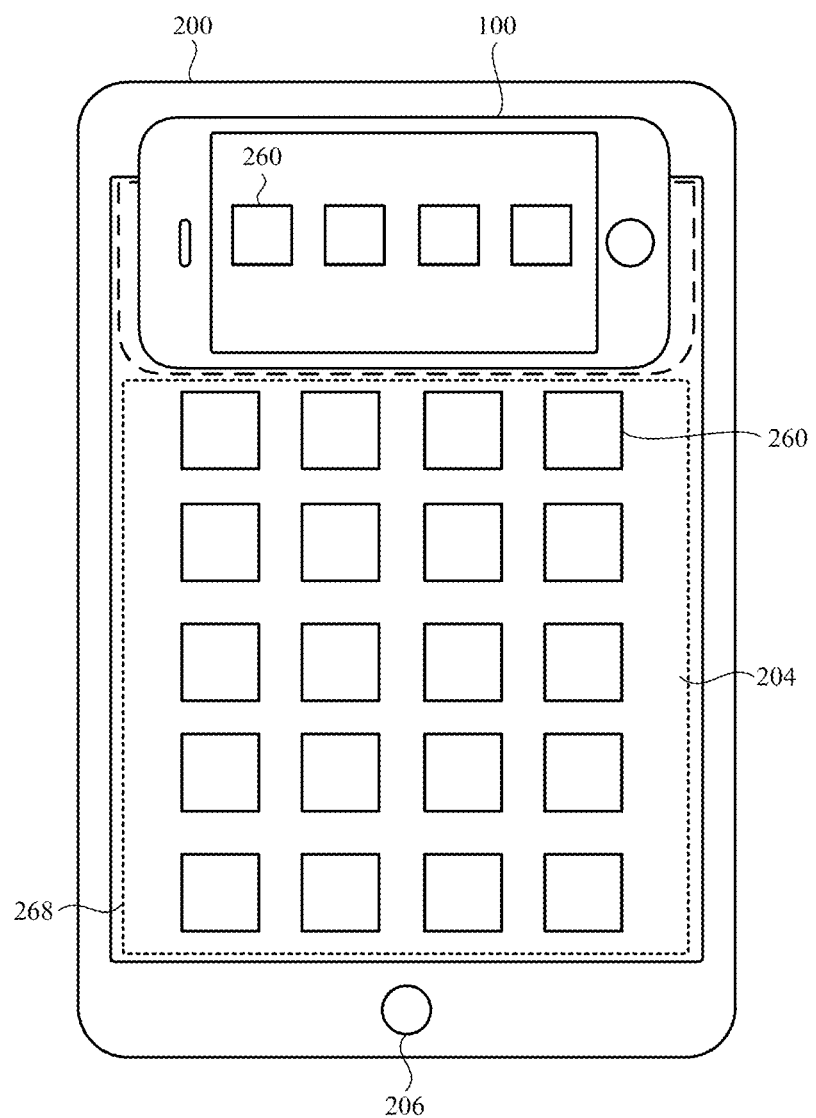
FIG. 27 shows an illustrative front view of the first electronic device of FIG. 1 displaying app icons of the second electronic device of FIG. 5A, according to another embodiment.

In another non-limiting example, as shown in FIGS. 26A-27, the visible and interactive display area of the electronic devices may be modified when positioning first electronic device 100 on second electronic device 200 to transmit power between the electronic devices. As shown in FIG. 26A, display area 268 of display 204 of second electronic device 200 may include the entire area of display 204 prior to moving first electronic device 100 over second electronic device 200 to induce a brief communication between inductive coils 112, 212*a-c*. However, as shown in FIG. 26B, once the brief coupling and/or communication is made between inductive coil 112 of first electronic device 100 and inductive coil 212*a* of second electronic device 200, display area 268 of display 204 may be reduced in size. Display area 268 may be reduced in size by the dimensions of device outline 266 displayed on display 204 of second electronic device 200 used to align inductive coil 112 and inductive coil 212*a*, as discussed herein.

As a result of the reduction in display area 268 of display 204, app icons 260 of second electronic device 200 may be altered or shifted on display 204. As shown by comparison in FIGS. 26A-26C, app icons 260 may be reduced from 24 app icons 260 displayed on display 204 (see, FIG. 26A) to 20 displayed app icons 260 (see, FIGS. 26B and 26C). In a non-limiting example, all app icons 260 of second electronic device 200 may shift down, such that the row of app icons 260 positioned closest to button 206 (FIG. 5A) of second electronic device 200 may now be displayed on a distinct app icons page of electronic device 200. In another non-limiting example, the row of app icons 260 positioned furthest from button 206 and may be covered by first electronic device 100 may be moved to a distinct app icons page of electronic device 200. As shown in FIG. 26C, although display area 268 of display 204 may be reduced when inductive coil 112 of first electronic device 100 is in electrical communication within inductive coil 212 of second electronic device 200, the reduced display area 268 may still be interacted with by a user of second electronic device 200. As shown in FIG. 26C, the first electronic device 100 may also present an indicator box 164 on display 104 which may provide a visual indicator to a user of the alignment between electronic devices 100, 200.

In an additional non-limiting embodiment and as discussed herein with respect to data transfer between electronic devices, first electronic device 100 may display app icons 260 of second electronic device 200 that may be otherwise covered by first electronic device 100. As shown in FIGS. 26A-C, inductive coil 112 of first electronic device 100 may be in electrical communication within inductive coil 212 of second electronic device 200 for receiving power from second electronic device 200. Additionally, inductive coil 212 may transmit data to first electronic device 100. The data transferred may include information associated with the app icons 260 that may be positioned in the row of app icons covered by first electronic device 100. As similarly discussed herein with respect to FIG. 25, first electronic device 100 may display the data transmitted by second electronic device 200. In the example of FIG. 27, first electronic device 100 may display the row of app icons 260 positioned furthest from button 206, and may allow a user to interact with these app icons 260. When a user interacts with the app icons 260 displayed on first electronic device 100, the app icon 260 may be opened in display area 268 of display 204 of second electronic device 200.

Figure 28:
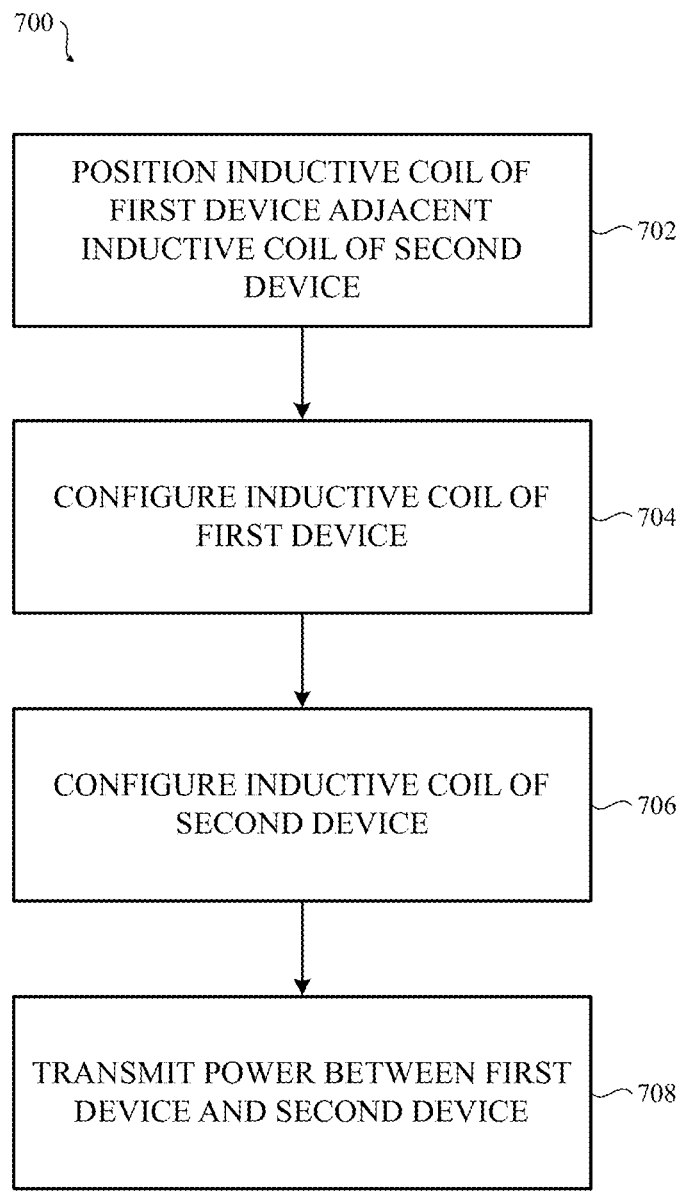
FIG. 28 depicts a flow chart illustrating a method for inductively charging an electronic device using an external electronic device. The method may be performed on the electronic devices as shown in FIGS. 1-27.

FIG. 28 depicts an example process for inductively charging a battery of an electronic device. Specifically, FIG. 28 is a flowchart depicting one example process 700 for inductively charging at least one electronic device using an external electronic device.

In operation 702, an inductive coil of a first electronic device may be positioned adjacent to an inductive coil of a second electronic device. The positioning may further include positioning the first electronic device directly on the second electronic device, and aligning the inductive coil of the first electronic device with the inductive coil of the second electronic device. The inductive coils may be aligned when the inductive coils are in electrical communication with one another. The positioning of the inductive coil of the first electronic device adjacent the inductive coil of the second electronic device may also include coupling a group of alignment magnets positioned within both the first electronic device and the second electronic device.

In operation 704, the inductive coil of the first electronic device may be configured. The configuring of the inductive coil of the first electronic device may include selecting the operational mode of the inductive coil using a controller coupled to the inductive coil. The operational mode of the inductive coil of the first electronic device may include a power receiving operational mode for wirelessly receiving power, which may be used to increase a charge of a battery of the first electronic device. The operational mode may also include a power transmitting operational mode for wirelessly receiving power, which may decrease the charge of the battery and/or draw power from an external power source, such as a wall outlet.

In operation 706, the inductive coil of the second electronic device may be configured. The configuring of the inductive coil of the second electronic device may include selecting the operational mode of the inductive coil using a controller coupled to the inductive coil. The operational mode of the inductive coil of the second electronic device may include a power receiving operational mode for wirelessly receiving power, which may be used to increase a charge of a battery of the first electronic device. The operational mode may also include a power transmitting operational mode for wirelessly receiving power, which may decrease the charge of the battery and/or draw power from an external power source, such as a wall outlet.

In operation 708, power may be wirelessly transmitted between the first electronic device and the second electronic device. More specifically, power may be transmitted from the inductive coil of the first electronic device to the inductive coil of the second electronic device, or from the inductive coil of the second electronic device to the inductive coil of the first electronic device. The transmission of power may be dependent on the operational mode of the inductive coil of the first electronic device and the second electronic device where the operational modes are distinct or different. As such, the transmitting of the power from the inductive coil of the first electronic device to the inductive coil of the second electronic device may further include determining if the inductive coil of the first electronic device is configured in a power transmitting operational mode, and determining if the inductive coil of the second electronic device is configured in a power receiving operational mode. Conversely, the transmitting of the power from the inductive coil of the second electronic device to the inductive coil of the first electronic device may further include determining if the inductive coil of the second electronic device is configured in a power transmitting operational mode, and determining if the inductive coil of the first electronic device is configured in a power receiving operational mode.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A portable electronic device comprising:
   an enclosure forming a back surface of the portable electronic device;
   a display coupled to the enclosure and forming a front surface of the portable electronic device that is opposite from the back surface of the portable electronic device;

a battery within the enclosure and providing electrical power to the display and a transmit inductive coil positioned within the enclosure and between the display and the back surface of the enclosure, the transmit inductive coil being configured to wirelessly transmit power through the back surface of the enclosure to an external device that is positioned proximate to the back surface of the enclosure.

2. The portable electronic device of claim 1, wherein the transmit inductive coil is operatively coupled to the battery and is configured to wirelessly transmit power from the battery to the external device.

3. The portable electronic device of claim 1, further comprising:
a receive inductive coil within the enclosure and configured to wirelessly receive power from the external device that is positioned proximate to the enclosure.

4. The portable electronic device of claim 1, wherein:
the transmit inductive coil is an inner inductive coil; and
the portable electronic device further comprises an outer inductive coil surrounding the inner inductive coil.

5. The portable electronic device of claim 4, wherein the portable electronic device is operable in two or more operational modes comprising a power receiving mode and a power transmitting mode and wherein:
the power receiving mode includes activating both the inner inductive coil and the outer inductive coil to receive wireless power; and
the power transmitting mode includes activating only the inner inductive coil to transmit wireless power.

6. The portable electronic device of claim 1, further comprising an alignment magnet positioned adjacent to the transmit inductive coil, wherein the alignment magnet is configured to assist in positioning the external device relative to the portable electronic device.

7. The portable electronic device of claim 1, further comprising:
a touch sensor positioned external to the enclosure;
a speaker within the enclosure and electrically coupled to the battery; and
a microphone within the enclosure and electrically coupled to the battery.

8. An electronic device comprising:
an enclosure forming a back surface of the electronic device;
a display coupled to the enclosure and forming a front surface of the electronic device that is opposite from the back surface of the electronic device;
a battery within the enclosure;
an inductive coil coupled to the battery and positioned within the enclosure between the front surface and the back surface of the enclosure, the inductive coil configured to wirelessly transmit power through the back surface of the enclosure to an external device that is positioned proximate to the back surface of the enclosure, and operate in two or more operational modes comprising:
a power receiving mode for wirelessly receiving power from the external device positioned proximate to the back surface; and
a power transmitting mode for wirelessly transmitting power to the external device positioned proximate to the back surface; and
a controller coupled to the inductive coil and configured to select one of the operational modes of the inductive coil.

9. The electronic device of claim 8, wherein:
the inductive coil is an inner inductive coil; and
the electronic device further comprises an outer inductive coil surrounding the inner inductive coil.

10. The electronic device of claim 9, wherein:
the power receiving mode includes activating both the inner inductive coil and the outer inductive coil to receive wireless power; and
the power transmitting mode includes activating only the inner inductive coil to transmit wireless power.

11. The electronic device of claim 8, further comprising an alignment magnet positioned adjacent to the inductive coil, wherein the alignment magnet is configured to assist in positioning the external device relative to the electronic device.

12. The electronic device of claim 8, further comprising:
a touch sensor disposed over the display;
a speaker within the enclosure and electrically coupled to the battery; and
a microphone within the enclosure and electrically coupled to the battery.

13. A system comprising:
a first electronic device comprising:
an enclosure forming a back surface of the first electronic device;
a display coupled to the enclosure and forming a front surface of the first electronic device that is opposite from the back surface of the first electronic device;
a first battery positioned within the enclosure;
a first inductive coil coupled to the first battery and positioned within the enclosure between the front surface and the back surface of the enclosure; and
a first controller coupled to the first inductive coil for selecting an operational mode of the first inductive coil; and
a second electronic device positioned adjacent the first electronic device, the second electronic device comprising:
a second battery;
a second inductive coil coupled to the second battery; and
a second controller coupled to the second inductive coil for selecting an operational mode of the second inductive coil, wherein:
the first inductive coil is configured to wirelessly transfer power with the second electronic device through the back surface of the first electronic device when the second electronic device is positioned proximate to the back surface of the first electronic device;
the first controller is configured to select a power transmitting operational mode for wirelessly transmitting power from the first battery to the second battery using the first inductive coil, and
the first controller is configured to select a power receiving operational mode for wirelessly receiving power from the second battery to the first battery using the first inductive coil.

14. The system of claim 13, wherein:
the first electronic device further comprises a first alignment magnet positioned adjacent to the first inductive coil;
the second electronic device further comprises a second alignment magnet positioned adjacent to the second inductive coil; and
the second alignment magnet is configured to attract the first alignment magnet to align the first inductive coil of the first electronic device with the second inductive coil of the second electronic device.

15. The system of claim 13, wherein:
the first electronic device further comprises an outer inductive coil surrounding the first inductive coil; and
the outer inductive coil is coupled to the first battery and the first controller.

16. The system of claim 15, wherein:
the second electronic device further comprises a second outer inductive coil surrounding the second inductive coil; and
the second outer inductive coil is coupled to the second battery and the second controller.

17. The system of claim 16, wherein:
the first inductive coil of the first electronic device is configured to wirelessly transfer power with at least one of:
the second inductive coil of the second electronic device; and
the second outer inductive coil of the second electronic device; and
the outer inductive coil of the first electronic device is configured to wirelessly transfer power with at least one of:
the second inductive coil of the second electronic device; and
the second outer inductive coil of the second electronic device.

18. The system of claim 13, wherein the first electronic device is configured to modify a graphical output of the display in response to the first electronic device being proximate to the second electronic device.

19. The system of claim 18, wherein the graphical output of the display indicates an alignment condition of the first electronic device with respect to the second electronic device.

20. The system of claim 13, wherein the back surface of the first electronic device includes a flat surface upon which the second electronic device is positioned to enable wireless power transfer between the first electronic device and the second electronic device.

* * * * *